United States Patent
Nakamura et al.

(10) Patent No.: US 11,656,456 B2
(45) Date of Patent: May 23, 2023

(54) OPTICAL ELEMENT AND OPTICAL APPARATUS

(71) Applicant: HOYA CORPORATION, Tokyo (JP)

(72) Inventors: Toshiki Nakamura, Tokyo (JP); Masaru Eguchi, Saitama (JP); Yutaka Takakubo, Saitama (JP); Yoshitake Tanno, Tokyo (JP); Naomi Matsumoto, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 294 days.

(21) Appl. No.: 16/991,411

(22) Filed: Aug. 12, 2020

(65) Prior Publication Data

US 2021/0048665 A1 Feb. 18, 2021

(30) Foreign Application Priority Data

Aug. 16, 2019 (JP) .............................. JP2019-149299

(51) Int. Cl.
*G02B 27/00* (2006.01)
*G02B 5/00* (2006.01)
*G02B 1/11* (2015.01)

(52) U.S. Cl.
CPC ............ *G02B 27/0018* (2013.01); *G02B 1/11* (2013.01); *G02B 5/003* (2013.01)

(58) Field of Classification Search
CPC ...... G02B 27/0018; G02B 1/11; G02B 5/003; G02B 5/226; G02B 1/10; G02B 3/00; G02B 5/04; G02B 27/00; G02B 5/00; G02B 7/02
See application file for complete search history.

(56) References Cited

U.S. PATENT DOCUMENTS

| | | | |
|---|---|---|---|
| 4,882,262 A * | 11/1989 | Wilwerding | G02B 3/0006 430/13 |
| 8,395,854 B2 | 3/2013 | Takakubo et al. | |
| 8,416,508 B2 | 4/2013 | Saori et al. | |
| 8,514,495 B2 | 8/2013 | Hayakawa | |
| 8,554,069 B2 | 10/2013 | Okuda | |
| 8,570,668 B2 | 10/2013 | Takakubo et al. | |
| 8,836,856 B2 | 9/2014 | Nomura | |
| 8,837,929 B2 | 9/2014 | Nomura et al. | |
| 9,063,392 B2 | 6/2015 | Okuda | |

(Continued)

FOREIGN PATENT DOCUMENTS

| | | |
|---|---|---|
| JP | 01-115842 | 5/1989 |
| JP | 06-059195 | 3/1994 |

(Continued)

OTHER PUBLICATIONS

Office Action from Japan Patent Office (JPO) in Japanese Patent Appl. No. 2019-149299, dated Jan. 31, 2023, together with an English language translation.

*Primary Examiner* — Balram T Parbadia
(74) *Attorney, Agent, or Firm* — Greenblum & Bernstein, P.L.C.

(57) ABSTRACT

An optical element including a glass body is provided. The optical element includes a colored layer provided inside the glass body and positioned outside an effective aperture of the optical element. Coloring of the colored layer is a reduction pigment occurring in a glass component of the glass body. The colored layer suppresses occurrence of stray light and obtains sufficient light-shielding properties, so that a superior image quality can be achieved.

18 Claims, 26 Drawing Sheets

(56) References Cited

U.S. PATENT DOCUMENTS

| | | |
|---|---|---|
| 9,204,049 B2 | 12/2015 | Nomura et al. |
| 9,606,370 B2 | 3/2017 | Suzuka |
| 10,048,507 B2 | 8/2018 | Nomura et al. |
| 2007/0273977 A1* | 11/2007 | Nemoto ............... G02B 5/003 264/1.36 |
| 2010/0027123 A1 | 2/2010 | Imai et al. |
| 2011/0002053 A1* | 1/2011 | Ovrutsky ............ G02B 3/0031 156/60 |
| 2012/0075727 A1 | 3/2012 | Takakubo et al. |
| 2012/0075728 A1* | 3/2012 | Takakubo .......... G02B 13/0065 359/737 |
| 2012/0176688 A1* | 7/2012 | Oh .................... B29D 11/0073 359/738 |
| 2012/0224241 A1* | 9/2012 | Nagata ................. G02B 3/005 359/201.1 |
| 2012/0262793 A1* | 10/2012 | Yoshikawa ............. C08K 3/22 430/286.1 |
| 2015/0103407 A1 | 4/2015 | Chen |
| 2015/0340351 A1* | 11/2015 | Rossi .................... H01L 33/58 257/82 |
| 2019/0084255 A1* | 3/2019 | Hanano ................ B33Y 80/00 |
| 2019/0285850 A1* | 9/2019 | Tan ....................... G02B 5/003 |
| 2019/0317318 A1 | 10/2019 | Ootsu et al. |
| 2020/0183058 A1* | 6/2020 | Shinohara ........... G02B 13/004 |

FOREIGN PATENT DOCUMENTS

| | | |
|---|---|---|
| JP | 07-124100 | 5/1995 |
| JP | 08-050251 | 2/1996 |
| JP | 2011-100056 | 5/2011 |
| JP | 2014/108566 | 7/2014 |
| JP | 5792026 B2 | 8/2015 |
| JP | 2019-090849 | 6/2019 |
| WO | 2019/151404 A1 | 8/2019 |

\* cited by examiner

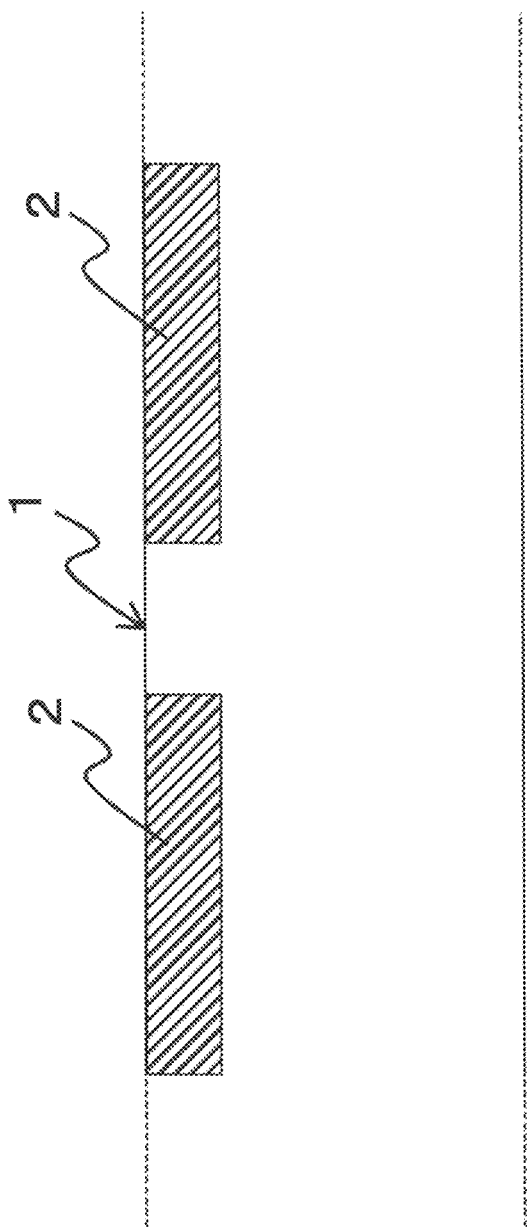

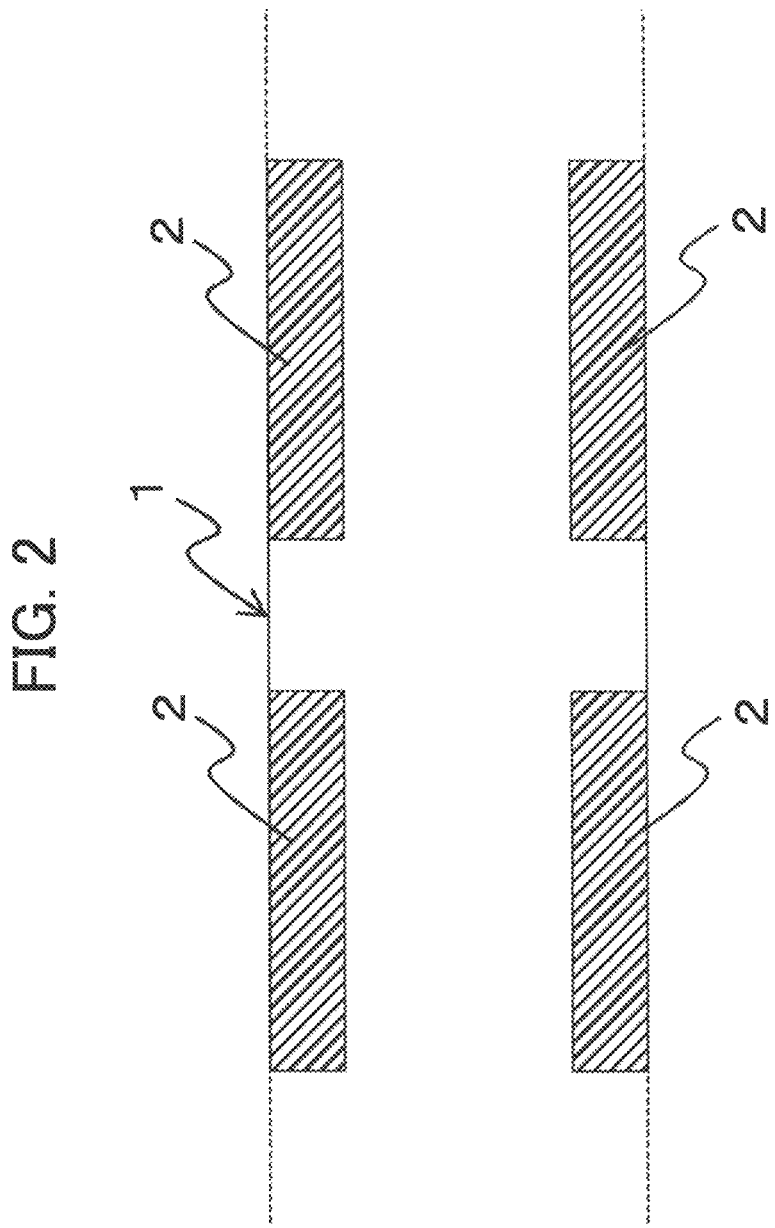

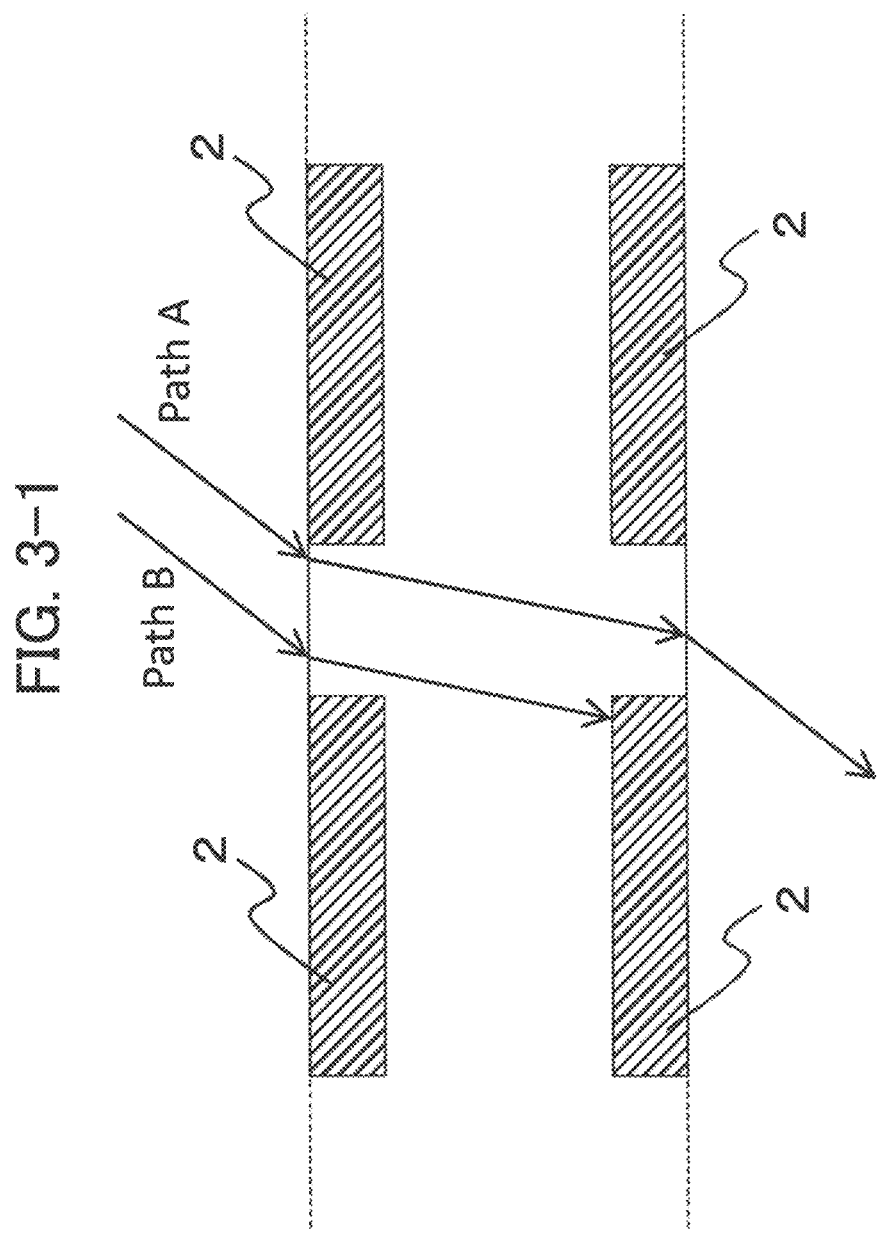

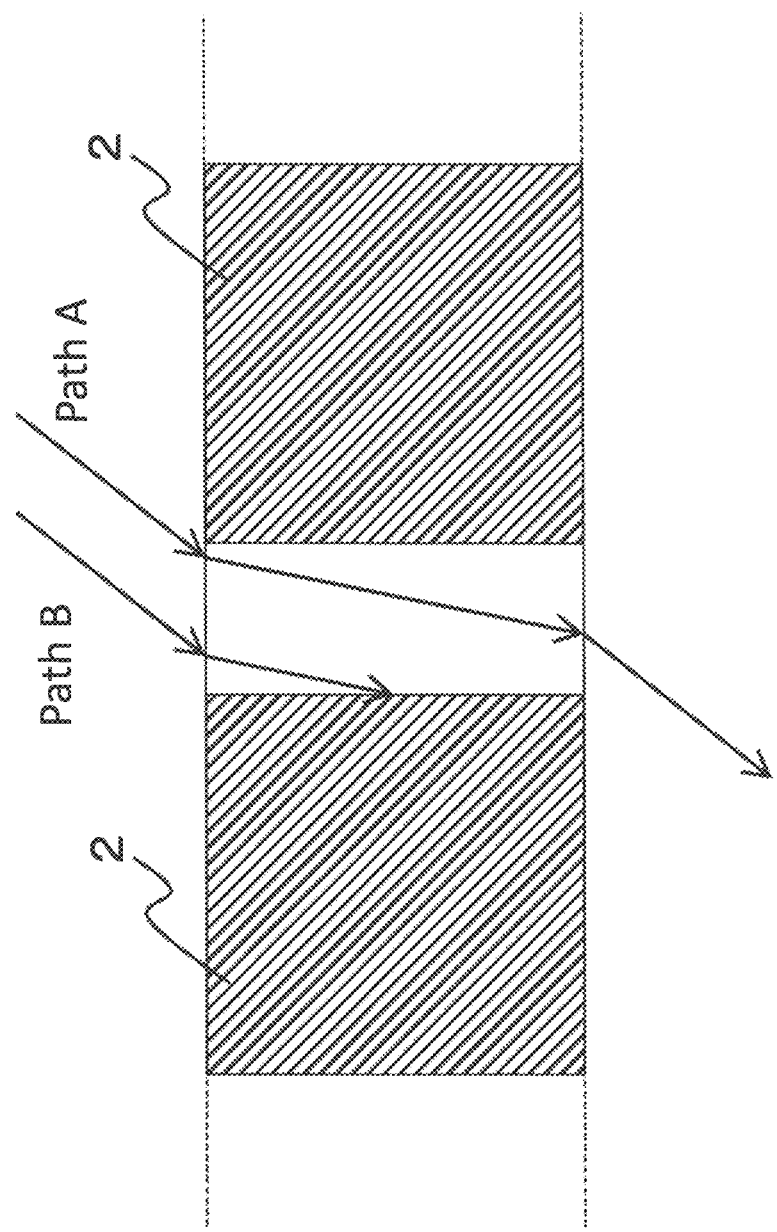

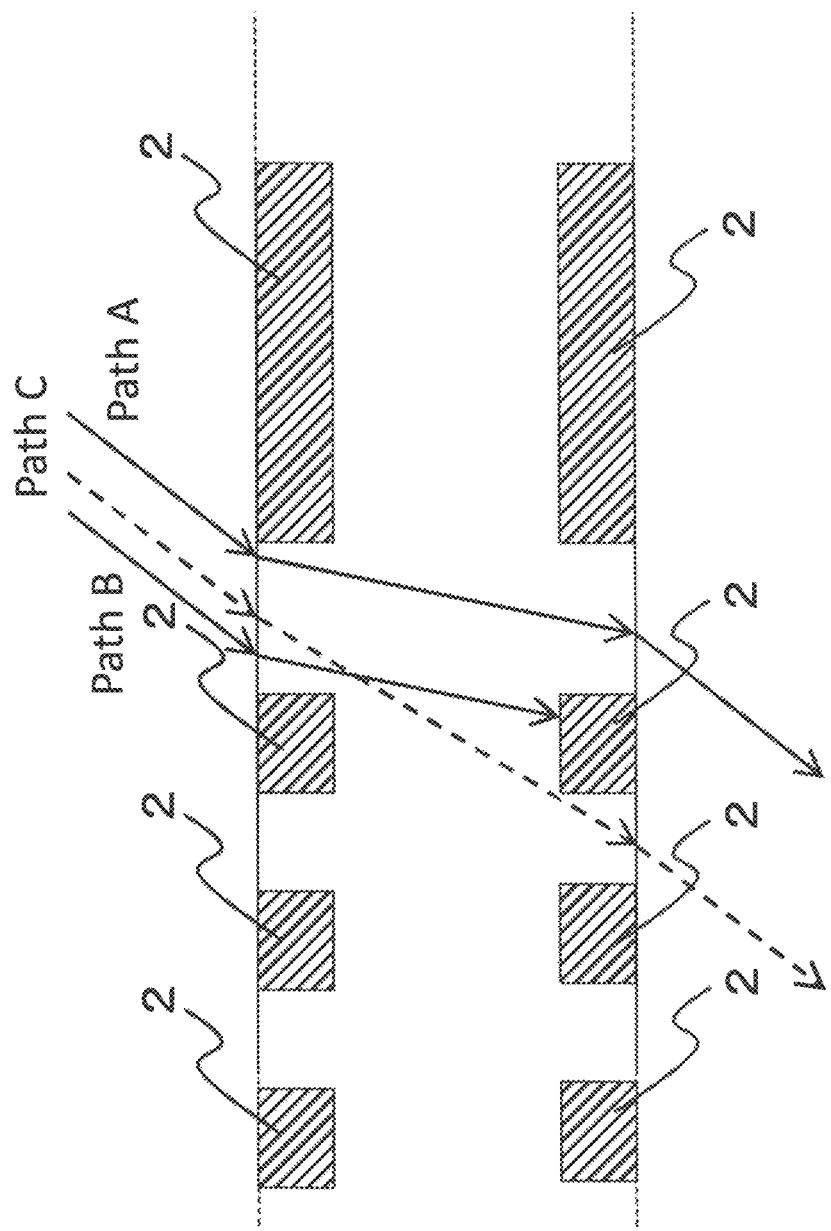

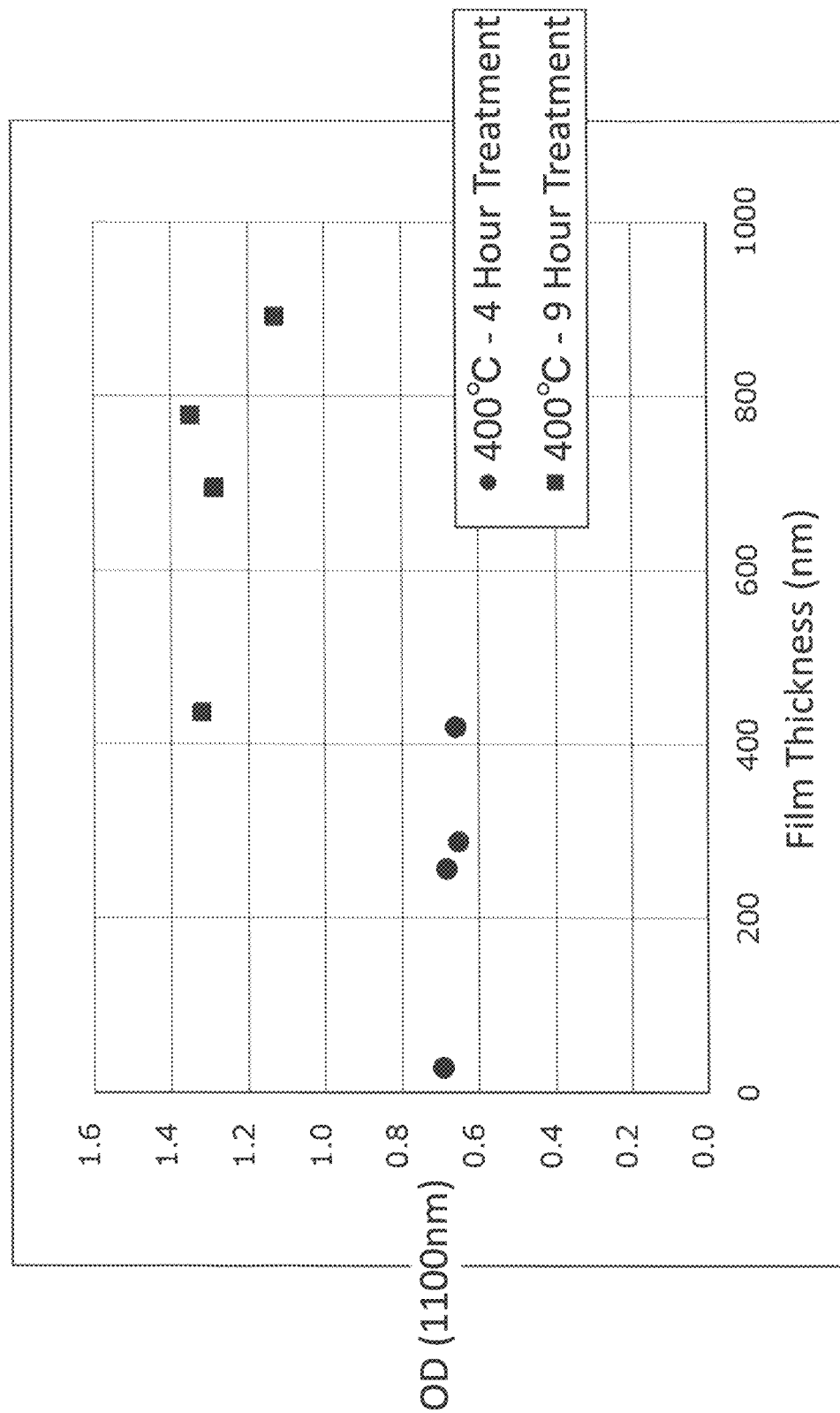

OPTICAL ELEMENT AND OPTICAL APPARATUS

BACKGROUND OF THE INVENTION

1. Field of the Invention

The present disclosure relates to an optical element and an optical apparatus. More specifically, the present disclosure relates to an optical element with added functionality via colored glass, an optical element partially provided with a colored layer, and an optical apparatus that uses either such optical element.

2. Description of Related Art

In optical systems and optical apparatuses, light incident on an optical element at a portion outside the effective aperture transmits through, or internally reflects inside, the optical element, and may arrive at a light-receiving element (such as a CCD or CMOS sensor or the like) to appear as stray light, such as ghosting or flare, etc. Accordingly, there are various countermeasures carried out for dealing with stray light in optical elements (e.g., lens elements, prisms, optical windows, and cover glasses, etc.) used in optical systems and optical apparatuses. For example, forming a rough surface, coating with Indian ink (black ink), or inserting a light-shielding sheet (light interception sheet) at a region at which internal reflection would otherwise occur or at a region in the path of stray light, are known conventional countermeasures for dealing with stray light.

Patent Literature 1 discloses an optical element formed from a glass material containing bismuth oxide. An altered layer containing metallic bismuth, resulting from reduction of bismuth oxide in the glass material, is formed on the glass surface of the optical element at a region outside the optical effective area. Specifically, the optical element is manufactured by a mold preparation process and a molding process. In the mold preparation process, an optical element molding die is prepared. The optical element molding die is provided with a molding surface having a shape (profile) that transfers the shape (profile) of the optical element onto the glass material; and is provided with a reduced layer, containing an element having a greater ionization tendency than bismuth, on at least a surface of the molding surface at a portion where the shape at the region outside the optical effective area of the optical element is transferred. In the molding process, the optical element molding die is placed in a non-oxidizing atmosphere, a heated glass material is pressed using the optical element molding die, whereby the shape (profile) of the optical element is transferred onto the glass material and an altered layer containing metallic bismuth is formed onto the surface of the glass material which is bonded to the reduced layer.

Patent Literature 1: Japanese Patent No. 5,792,026

However, if a rough surface is used as a countermeasure for stray light, although the specular reflection component (regular reflection component) of the light may be reduced, scattered light also occurs, thereby becoming a source of flare, by which a haze appears over the entire picture image (picture frame).

If black ink is used as a countermeasure against stray light, since it becomes difficult to bond (adhere) the optical element onto a mirror-finished surface portion (ultra-smooth optically polished surface portion), the areas (regions) in which black ink can be coated is limited. Furthermore, in order to achieve sufficient light-shielding properties, it is necessary to provide a thick coating of black ink. However, irregularities in the coating thickness of the black ink easily occur, causing a variation in dimensional precision of the outer diameter and/or the edge thickness of the optical element. Furthermore, the border portion of the black ink coating (edge surface) also possesses a thickness, so that the edge surface of the black ink coating becomes a cause of stray light. Whereas, if only a thin coating of black ink is applied, stray light may pass through the black ink so that a sufficient light-shielding effect cannot be obtained.

In the case where the insertion of a light-shielding sheet is used as a countermeasure against stray light, if the light-shielding sheet is too thick, stray light caused by the aperture-edge surface of the light-shielding sheet may occur. Accordingly, it is necessary to insert a light-shielding sheet that is as thin as possible. However, if the light-shielding sheet is too thin, handling the light-shielding sheet becomes difficult due to difficulties in positioning the light-shielding sheet at the desired (design) position upon being inserted into the lens frame due to the light-shielding sheet twisting, and a crease may form in the light-shielding sheet when being held with tweezers, etc. Furthermore, since the lens frame will have optical elements fixed thereto on either side of the light-shielding sheet, tilting of the optical elements inside the lens frame can easily occur, which leads to deterioration of assembly precision.

Strictly speaking, the aforementioned altered layer containing metallic bismuth disclosed in Patent Literature 1 includes irregularities (concavities and convexities) occurring on the glass surface of the optical element, so that the altered layer can be regarded as, originally, a separate (different) component from the optical element (glass material). Furthermore, the purpose of forming the altered layer containing metallic bismuth in Patent Literature 1 is for improving adhesion properties of a light-absorbing coating, such as black ink, by surface roughening the glass surface. Hence, although metallic bismuth particles have light absorbing properties, it is necessary to apply a light absorbing coating in order to prevent flare and ghosting, so that it cannot be concluded that the altered layer (on its own) containing metallic bismuth has sufficient light-shielding properties. Furthermore, since the technology disclosed in Patent Literature 1 requires a press-forming process to be performed on the glass material using an optical element molding die, provided with a reduced layer containing an element having a greater ionization tendency than bismuth, there is the problem of not being able to form an altered layer containing metallic bismuth on optical elements that are manufactured by grinding and polishing the glass base-material.

SUMMARY OF INVENTION

In view of the aforementioned problems, the illustrated embodiments of the invention provide an optical element and an optical apparatus that suppress occurrence of stray light, and can obtain sufficient light-shielding properties.

The optical element of the present disclosure includes a glass body including a colored layer provided inside the glass body and positioned outside an effective aperture of the optical element.

In the illustrated embodiments, the term "inside the glass body" refers to the literal meaning of inside the glass body, and also refers to the surface of the glass body. In other words, the colored layer may be positioned from a surface of the glass body and extends inside the glass body, or may be positioned inside the glass body without being positioned on the surface of the glass body.

It is desirable for a thickness of the colored layer from the surface of the glass body and extending inside the glass body to be 1 through 300 µm.

It is desirable for an optical density OD of the colored layer to be 2.0 or more at a wavelength of 750 nm.

The colored layer can be formed from the same composition as that of the glass body. However, the valence of the glass component (cation) may be different between the glass body and the colored layer.

It is desirable for the optical element to be provided with an anti-reflection coated surface and a surface without an anti-reflection coating, wherein the colored layer is provided at the surface without an anti-reflection coating.

It is desirable for the optical element to include a prism, including an incident surface, an exit surface, a reflection surface and a side surface, and for the colored layer to be provided on the prism on at least one of the incident surface, the exit surface, the reflection surface, the side surface, and a chamfered surface at a boundary portion defined at any one of the incident surface, the exit surface, the reflection surface and the side surface.

It is desirable for the optical element to include a lens element, and for the colored layer to be provided on at least one of an edge surface and a land surface of the lens element.

It is desirable for the optical element to include two adjacent lens elements, wherein each of the two adjacent lens elements includes a land surface positioned radially outside the effective aperture of the lens element thereof, and the respective land surfaces of the two adjacent lens elements are brought into contact with each other, and wherein the colored layers are respectively provided on the land surfaces.

It is desirable for the optical element to include a lens element, and for the colored layer to define an effective aperture on at least one surface of the lens element.

It is desirable for the optical element to include a lens element, and for the colored layer to be provided at mutually different colored regions, outside the effective aperture, on one and the other surfaces of the lens element.

It is desirable for the optical element to include a plurality of lens surfaces, and for the colored layer to be provided outside effective apertures of the plurality of lens surfaces, respectively, to thereby partition the plurality of lens surfaces.

It is desirable for the optical element to include an exit window, from which light that is emitted from a light emitter exits, and an incident window, to which light travelling toward a light receiver is incident, and for the colored layer to be provided outside an effective aperture of the exit window and outside an effective aperture of the incident window so that the colored layer partitions the exit window and the incident window.

It is desirable for the optical element to include at least one of a flat parallel plate, a cover glass, an optical filter, and a beam splitter, and for the colored layer to be provided outside an effective aperture of the at least one of the flat parallel plate, the cover glass, the optical filter, and the beam splitter.

In another embodiment, an optical apparatus is provided with any of the above-described optical elements Accordingly, an optical element and an optical apparatus, can be provided, that suppress occurrence of stray light and can obtain sufficient light-shielding properties.

The present disclosure relates to subject matter contained in Japanese Patent Application No. 2019-149299 (filed on Aug. 16, 2019) which is expressly incorporated herein in its entirety.

BRIEF DESCRIPTION OF THE DRAWINGS

Embodiments and examples of the invention will be discussed below in detail with reference to the accompanying drawings, in which:

FIG. 1 shows a schematic view of an embodiment of the present invention;

FIG. 2 shows a schematic view of an embodiment of the present invention;

FIG. 3-1 shows a schematic view of an embodiment of the present invention;

FIG. 3-2 shows an explanatory schematic view of the embodiment shown in FIG. 3-1;

FIG. 4 shows a schematic view of an embodiment of the present invention;

FIG. 5-1 is an image showing a sample of Example 1-1, and a ruler for reference;

FIG. 5-2 is an image showing a sample of Example 1-2, and a ruler for reference;

FIG. 6-1 shows a graph indicating the transparency of a portion of the sample, in Example 1-1, that has a colored layer;

FIG. 6-2 shows a graph indicating the transparency of a portion of the sample, in Example 1-2, that has a colored layer;

FIG. 6-3 shows a graph indicating the transparency of a portion of the sample, in Example 1-3, that has a colored layer;

FIG. 7-1 shows a graph indicating, per each film thickness of metallic films, the transparency of a portion of the sample, in Example 2-1, that has a colored layer;

FIG. 7-2 shows a graph indicating, per each film thickness of metallic films, the transparency of a portion of the sample, in Example 2-2, that has a colored layer;

FIG. 8 shows a graph indicating, per heat-treatment time, relationships between the film thickness of metallic films and the OD (optical density) of the samples in Examples 2-1 and 2-2;

DESCRIPTION OF THE EMBODIMENTS

<<Explanation of Basic Principles>>

Figures 1, 5:
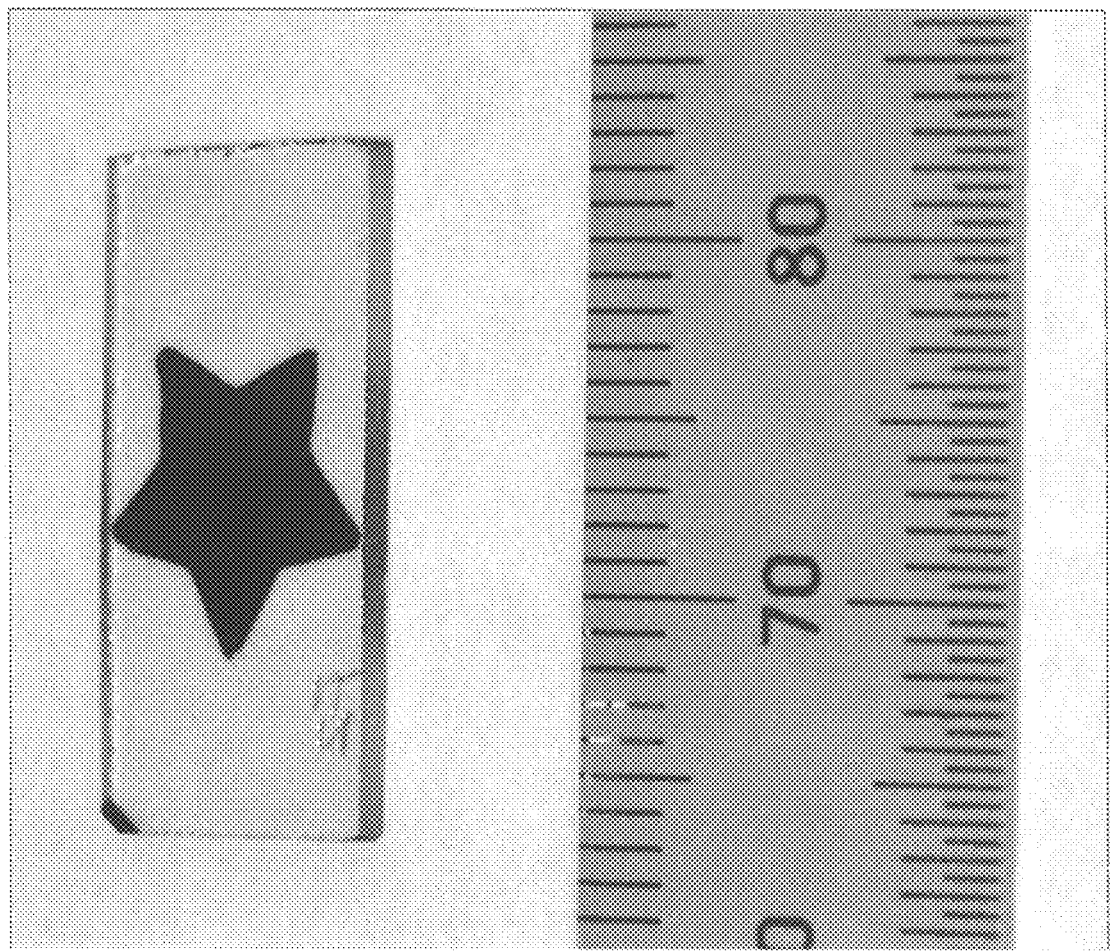

The optical element of the present disclosure is an optical element (glass element) provided with a glass body, and a colored layer(s) provided within the glass body and positioned outside the optical effective aperture of the optical element.

In the illustrated embodiments/example, "inside the glass body" refers to the literal meaning of inside the glass body, and also refers to the surface of the glass body. In other words, the colored layer can be provided at a position from the surface of the glass body through to a position inside the glass body, or can be provided at a location inside the glass body without being positioned on the surface of the glass body. In either case, the colored layer takes on the form of an altered layer inside the glass body, so that due to light passing through the glass body being absorbed by the colored layer, occurrence of stray light can be suppressed to thereby achieve sufficient light-shielding properties.

Firstly, by referring to FIGS. 1 through 9, how the colored layer is formed inside the glass body, the structure and function of the colored layer, and the underlying principle will be discussed.

In the present disclosure, the glass material (glass element) used will be described based on content ratios for each component indicated as cation %. Accordingly, unless otherwise stated, each content amount will be hereinafter referred as "%" or "cation %".

The indication of cation % herein refers to a mole percentage for when a content of all cation components is determined as 100%. Furthermore, the total content amount refers to a total content of a plurality types of cation components (including the case where the content is 0%). Furthermore, a cation ratio refers to a proportion (ratio) of content amounts between two cation components (including total content of a plurality of type of cation components) and will be indicated as a cation %.

The content of a glass component can be quantitatively determined by known methods such as, e.g., Inductively Coupled Plasma-Atomic Emission Spectrometry (ICP-AES) or Inductively Coupled Plasma-Mass Spectrometry (ICP-MS). Furthermore, in the present disclosure (the description and illustrated Examples), a constituent content of 0% refers to such a constituent as, in effect, not being included, but it may include an amount up to an unavoidable impurity level.

In the present disclosure, a refractive index refers to a refractive index nd on the d-line (wavelength 587.56 nm), unless otherwise stated.

The glass material (glass body) disclosed in each Example is provided with a colored layer(s). The color layer is a portion of the glass that is colored, and is preferably formed (positioned) from the glass surface and extends inside the glass to form an altered layer. Alternatively, the colored layer may be formed as an altered layer inside the glass without being formed at the glass surface.

The colored layer constitutes a portion that has a low transmittance with respect to light that is incident on the glass element. Accordingly, in the glass element (glass material) of the illustrated Examples, out of the light that is incident on the glass element, the light that is incident on the colored layer is partially or completely absorbed and the intensity of the transmitted light decays compared to the light that is not incident on the colored layer. In other words, the glass element (glass material) of the illustrated Examples can include a portion that has a low transmittance and a portion that has a high transmittance.

In the glass element of the illustrated Examples, the colored layer can be removed by grinding or polishing. In the glass element of the illustrated Examples, the transmittance of the glass element after the colored layer is removed is greater than the transmittance thereof before the colored layer is removed.

Figures 2, 5:
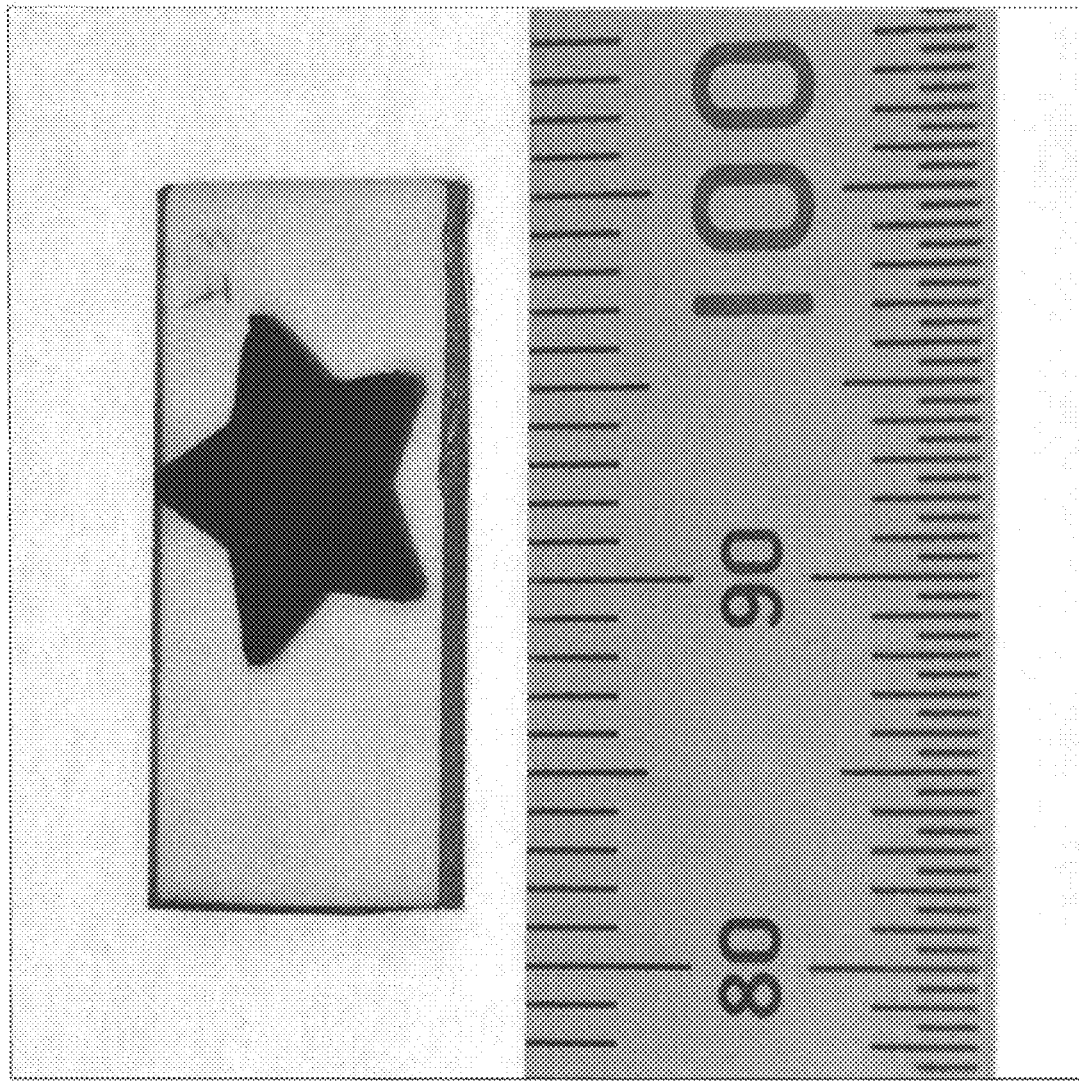

In the illustrated Examples, in the case where the glass element has, e.g., two opposing surfaces, colored layers 2 may be provided only on one side of a glass body 1, as shown in FIG. 1, or may be provided on both sides of the glass body 1, as shown in FIG. 2. In the example shown in FIG. 1, two colored layers 2 are provided on the upper surface of the glass body 1 and are separated from each other in the horizontal direction (leftward/rightward direction). In the example shown in FIG. 2, two colored layers 2, separated from each other in the horizontal direction (leftward/rightward direction), are provided on each of the upper and lower sides of the glass body 1 (so that there are a total of four colored layers 2).

Figures 1, 6:
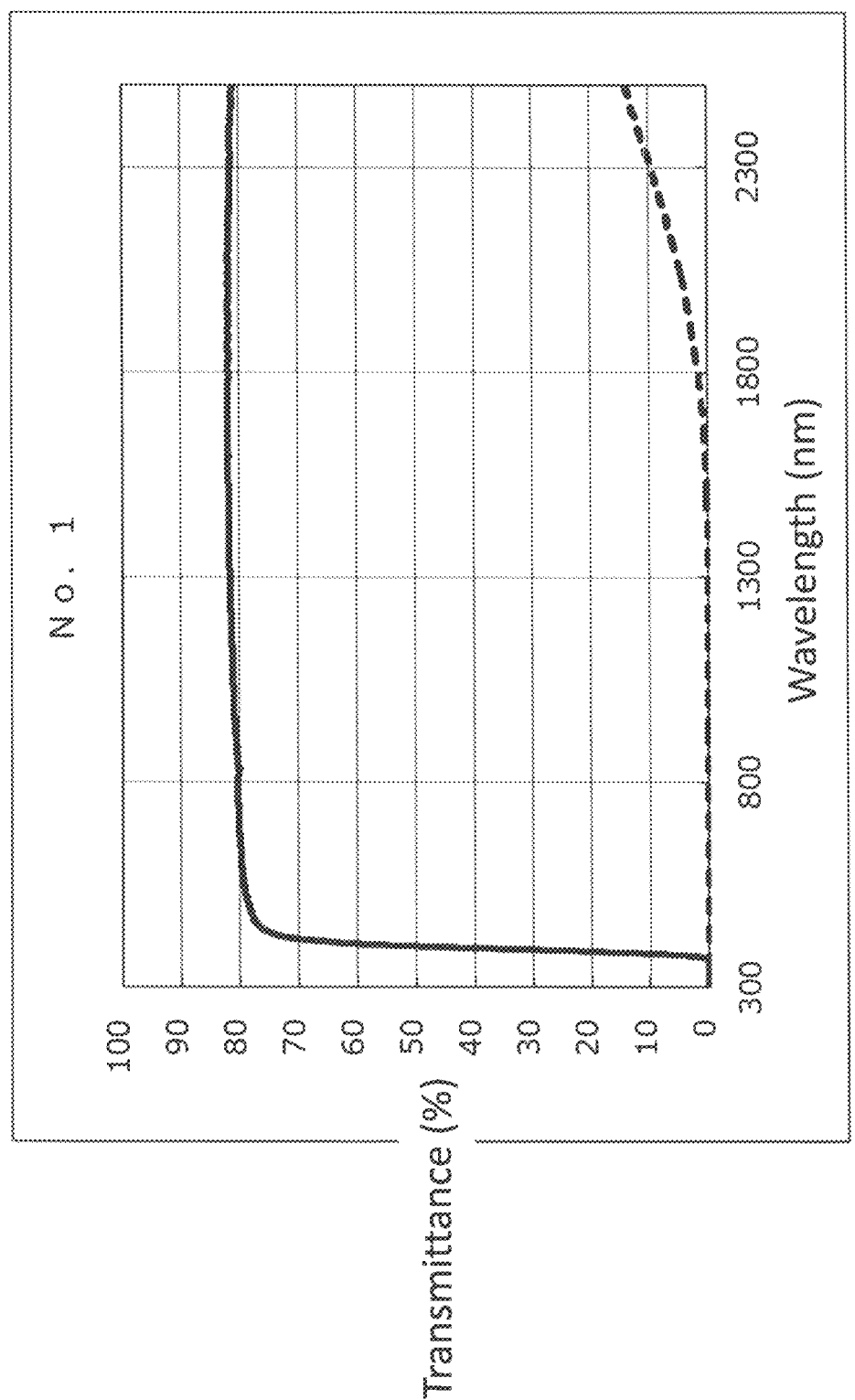
Figures 2, 6:
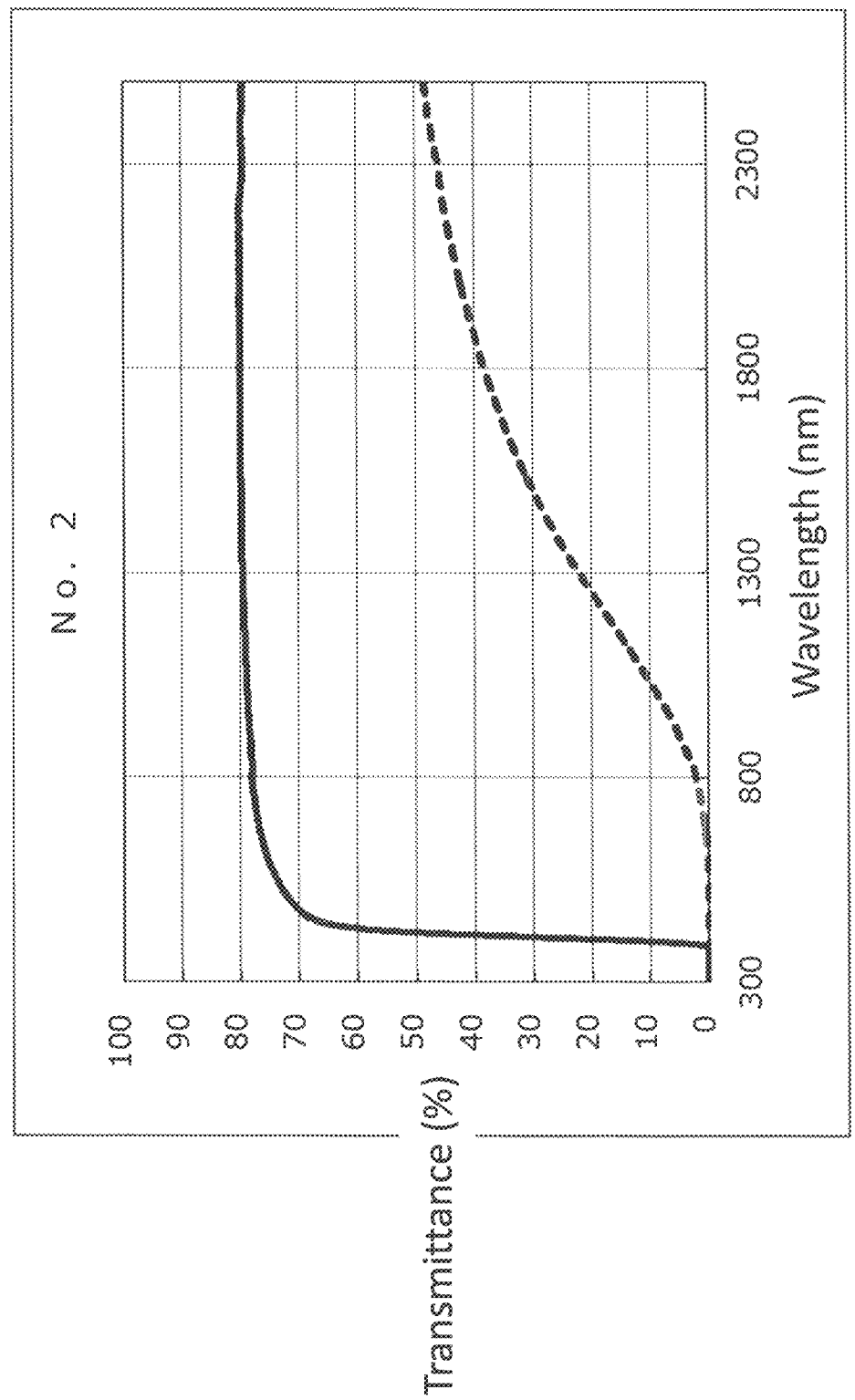
Figures 3, 6:
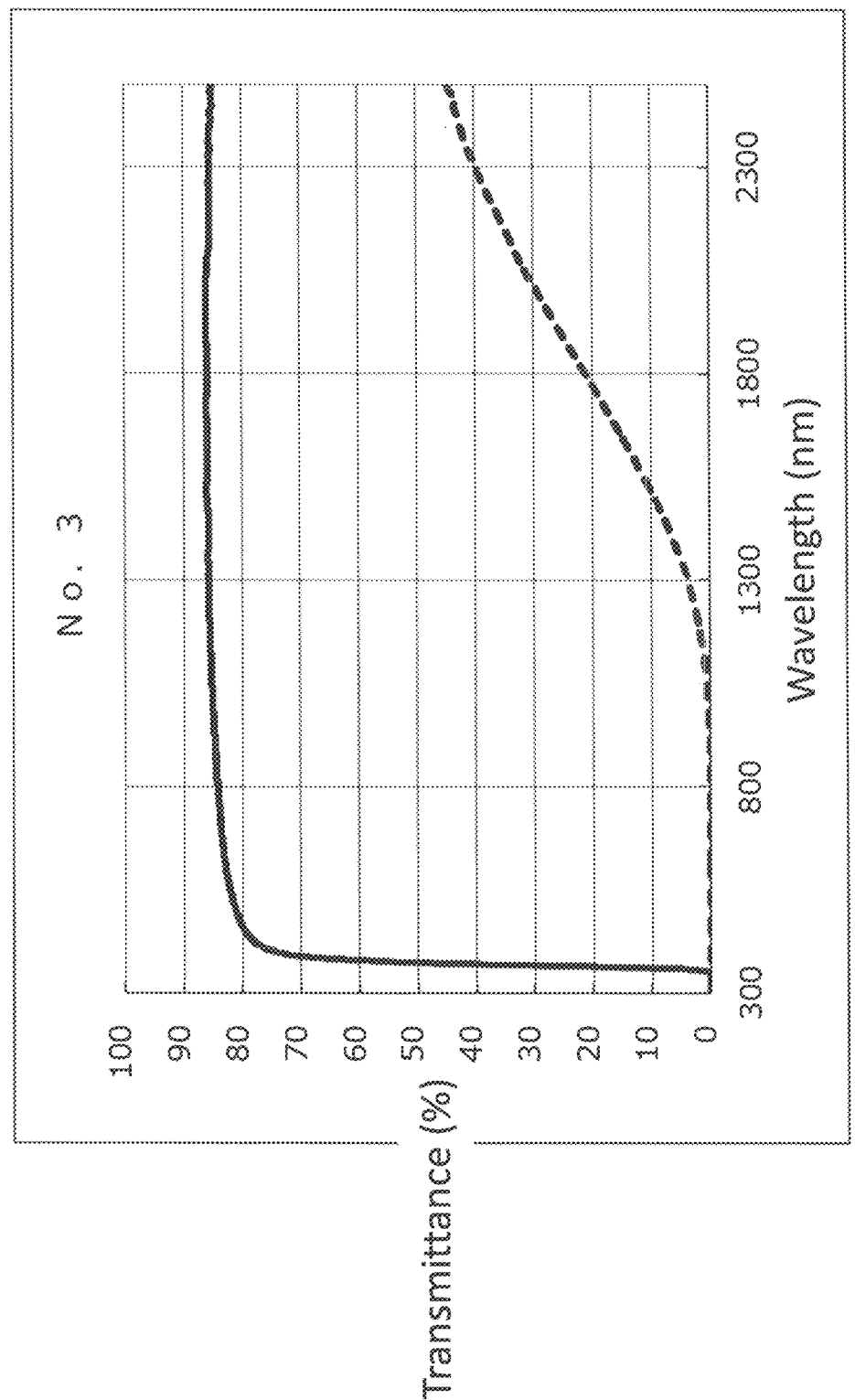

Furthermore, as shown in FIG. 3-1, by selectively forming the colored layers 2 on the glass surface, light can be shielded at portions where the colored layers 2 are formed and light can be transmitted at portions where the colored layers 2 are not formed. Furthermore, e.g., a slit, diaphragm or pinhole function, etc., can be added to the glass element by forming the colored layers 2 into a specified pattern.

As shown in FIG. 3-1, since there is no colored layer 2 in a light path A, the light along path A transmits from one surface to the other surface. Whereas, since there is a colored layer 2 in path B, the light along path B is absorbed by a colored layer 2 (the left colored layer 2 on the lower surface of the glass body 1 in FIG. 3-1). Furthermore, since the colored layers 2 have the same composition as the non-colored portions (the glass body 1), no difference in refractive index exists within the glass element, nor does light reflect from the boundaries between the colored layers 2 and the non-colored portions. In this case, regarding light transmittance, the same effect can be obtained as in the case where the colored layers 2 are provided across the entire thickness of the glass element, as shown in FIG. 3-2. Note that, as commonly known in the art, the relationship between the incident angle and the angle of refraction is determined by the refractive index at the surface of the glass element and by the refractive index of the medium (such as air) in contact with the glass element. This relationship should be considered when determining the area(s) of the colored layer(s) on the glass surface, the slit width, and the diameter of the diaphragm, etc.

As will be discussed below, the glass element (glass material) of the illustrated Examples can be used as an optical element. From the viewpoint of using the glass element as an optical element, it is desirable for the glass material of the illustrated Examples be optical glass.

In the glass material of the illustrated Examples, the colored layer(s) and the non-colored layer(s) have the same glass component composition. However, the valence of the glass component (cation) may be different between the colored layer(s) and the non-colored layer(s).

In the glass element (optical element) of each illustrated Example, since the refractive index of the colored layer(s) is the same as that of the glass body, light that is incident onto the colored layer from outside the glass body (as with light that is incident on a non-colored layer from the outside of the glass body) shows reflection properties (Fresnel reflection), depending on the angle of incidence, in accordance with the refractive index of the glass element at the glass surface and the refractive index of the medium (e.g., air) that is in contact with the glass element. Accordingly, a reflection-preventing coating may be coated on the optical element, including a colored portion(s), as necessary, in order to reduce reflection at the glass surface.

It is desirable for the coloring of the colored layer(s) to be a reduction pigment occurring in the glass component, and preferably a reduction pigment occurring in a transition metal. Examples of such a transition metal are Ti (titanium), Nb (niobium), W (tungsten) and Bi (bismuth). Accordingly, it is desirable for the glass material (glass element) of the present disclosure to include, as a glass component, at least one ion selected from the group consisting of Ti-ion, Nb-ion, W-ion, and Bi-ion; the Bi-ion is the most preferable out of this group.

[Thickness of Colored Layer]

Although there are no particular restrictions regarding the thickness of the colored layer, it is desirable for the thickness to be 1 through 300 μm, preferably 20 through 200 μm, and more preferably 30 through 150 μm.

[Optical Density (OD)]

In the glass material of the present disclosure, the spectral transmittance of the colored layer from the visible light region (a wavelength region of 400 nm to 760 nm) through to the infra-red region shows a tendency to increase as the wavelength increases. Whereas, the OD of the colored layer shows a tendency to decrease as the wavelength increases. OD refers to the optical density and, as indicated in the following formula, is expressed as a negative common logarithm value of a ratio of the transmitted light intensity I to the incident light intensity $I_o$.

$$OD = -\log_{10}(I/I_o)$$

In the case where the glass material of the illustrated Examples includes a colored layer(s) and a non-colored portion(s), having a large transmittance in the visible light region, the OD of the colored layer(s) is large, whereas the OD of the non-colored portion(s) is small. When measuring the OD, if the measurement light passes through both a colored layer and a non-colored portion, since the OD of the non-colored portion is sufficiently small, the OD of the colored layer becomes dominant.

Note that in a glass element (glass material) having two opposing surfaces, the OD for the case where incident light passes through colored layers provided on both of the two surfaces is approximately double of the OD for the case where the same colored layer is provided only on one of the two surfaces.

[Refractive Index]

The refractive index nd of the glass element (glass material) of the present disclosure is desirably 1.70 or more, and is further desirably 1.73 or more, 1.75 or more, 1.76 or more, 1.77 or more, 1.78 or more, 1.79 or more, and 1.80 or more, in that order. Although there is no specified upper limit for the refractive index nd, the upper limit is normally 2.5, and preferably 2.3.

FIG. 4 shows a glass element, having two opposing surfaces, in which a plurality of colored layers is provided at predetermined intervals on the two opposing surfaces at relative (opposing) positions so that the portions where colored layers are not formed function as slits (slit portions). In such a case, if the refractive index is low and the angle of incidence of light rays incident at the slit portions is large (i.e., the light rays are incident at a shallow angle), there is a risk of light rays passing through a neighboring slit, like in path C in FIG. 4, so that the same effect as that obtained by the element shown in FIG. 3-2 cannot be achieved. Whereas, if the refractive index of the glass element is set high, like in the above-indicated ranges, since the light rays, as indicated in path B, are absorbed by a colored layer formed on an undersurface of the glass element, the slit intervals can be narrowed due to the light rays not passing through a neighboring slit.

If the glass element of the illustrated Examples is used as an optical element, as discussed below, such as, e.g., a lens element, since a glass material having a high refractive index can allow the radius of curvature to be increased (to have a more gentle curvature) in order to achieve a lens element having the same refractive power (focal length), occurrence of various aberrations can be suppressed, and the lens thickness can be slimmed down (made thinner in the optical-axis direction). Furthermore, for example, if the glass element of the illustrated Examples is used in a prism, since a glass material having a high refractive index reduces the critical angle, a broader total-reflection angle range can be achieved for the regular light (effective light rays) incident on a reflection surface of the prism, so that a total-reflection coating does not need to be applied.

[Average Coefficient of Linear Expansion]

In the glass material of the present disclosure, the average coefficient of linear expansion is desirably $50 \times 10^{-7} K^{-1}$ or more, and more preferably $60 \times 10^{-7} K^{-1}$ or more, $70 \times 10^{-7} K^{-1}$ or more, $75 \times 10^{-7} K^{-1}$ or more, $80 \times 10^{-7} K^{-1}$ or more, $85 \times 10^{-7} K^{-1}$ or more, and $90 \times 10^{-7} K^{-1}$ or more, in that order. Although there are no particular restrictions regarding the upper limit of the average coefficient of linear expansion, the upper limit is normally $200 \times 10^{-7} K^{-1}$, and preferably $150 \times \times 10^{-7} K^{-1}$. By setting the average coefficient of linear expansion to within the above-indicated ranges, the strength of the glass material can be increased if a chemical strengthening applied thereto.

The method of measuring the average coefficient of linear expansion is according to the standards specified in Japan Optical Glass Manufacturers' Association JOGIS08-2003: "Thermal expansion measurement method of optical glass", with the proviso that the cylindrical rod test piece has a diameter of 5 mm.

[Acid Durability Weight Reduction Rate Da]

In the glass material of the present disclosure, the grade of acid resistance weight reduction ratio Da is desirably grade 1 or 2, and preferably grade 1.

The acid durability weight reduction rate Da is measured according to the standards specified in Japan Optical Glass Manufacturers' Association JOGIS06-2009. Specifically, powdered glass (having particle sizes of 425 μm through 600 μm), weighed by its specific gravity, is placed in a platinum basket and soaked in 0.01 mol/L of aqueous solution of nitric acid contained in a quartz glass round-bottomed flask, is treated for 60 minutes in a bath of boiling water, and the weight reduction rate (%) is measured before and after the treatment. The grades for the acid durability weight reduction rate Da are shown in Table A.

TABLE A

| Grade | Weight Reduction Rate (%) |
| --- | --- |
| 1 | Less than 0.20 |
| 2 | Greater than or Equal to 0.20, and Less than 0.35 |
| 3 | Greater than or Equal to 0.35, and Less than 0.65 |
| 4 | Greater than or Equal to 0.65, and Less than 1.20 |
| 5 | Greater than or Equal to 1.20, and Less than 2.20 |
| 6 | Greater than or Equal to 2.20 |

[Glass Composition]

The following description discusses non-limiting examples of compositions of the glass material of the present disclosure.

It is desirable for the glass material of the present disclosure to be phosphate glass. Phosphate glass refers to a glass containing mainly $P^{5+}$ as a glass network formation component. $P^{5+}$, $B^{3+}$, $Si^{4+}$ and $Al^{3+}$, etc., are known glass network formation components. Note that mainly containing phosphate as a glass network formation component means that the $P^{5+}$ content is greater than each of $B^{3+}$, $Si^{4+}$ and $Al^{3+}$. Using phosphate glass enables an increase in the coloration in the colored layer.

In the glass material of the present disclosure, the lower limit of the $P^{5+}$ content is desirably 10%, and more preferably 13%, 15%, 17% and 20%, in that order. Furthermore, the upper limit of the $P^{5+}$ content is desirably 50%, and more preferably 45%, 40%, 38%, 35%, 33% and 30%, in that order.

$P^{5+}$ is a glass network formation component. Whereas, if an excess amount of $P^{5+}$ is included, the meltability deteriorates. Therefore, it is desirable for the $P^{5+}$ content to be within the above-mentioned ranges.

In the glass material of the present disclosure, the upper limit of the $B^{3+}$ content is desirably 30%, and more preferably 25%, 20%, 15%, 13% and 10%, in that order. Furthermore, the lower limit of the $B^{3+}$ content is desirably 0.1%, and more preferably 0.5%, 1%, 3% and 5%, in that order. The $B^{3+}$ content may be 0%.

$B^{3+}$ is a glass network formation component, and functions to improve the meltability of the glass material. However, if there is too much $B^{3+}$ content, there is a tendency for the chemical durability to deteriorate. Therefore, it is desirable for the $B^{3+}$ content to be within the above-mentioned ranges.

In the glass material of the present disclosure, it is desirable for the upper limit of the cation ratio $[B^{3+}/P^{5+}]$ of the $B^{3+}$ content to the $P^{5+}$ content to be 0.70, and preferably 0.60, 0.55 and 0.50, in that order. The cation ratio $[B^{3+}/P^{5+}]$ may be 0 (zero).

In the glass material of the present disclosure, the upper limit of the $Si^{4+}$ content is desirably 10%, and more preferably 7%, 5%, 3%, 2% and 1%, in that order. Furthermore, the lower limit of the $Si^{4+}$ content is desirably 0.1%, and more preferably 0.2%, 0.3%, 0.4% and 0.5%, in that order. The $Si^{4+}$ content may be 0%.

$Si^{4+}$ is a glass network formation component, and functions to improve thermal stability, chemical durability and weatherability of the glass material. However, if there is too much $Si^{4+}$ content, there is a tendency for the meltability of the glass material to decrease, and for unmelted glass raw material to remain. Therefore, it is desirable for the $Si^{4+}$ content to be within the above-mentioned ranges.

In the glass material of the present disclosure, the upper limit of the $Al^{3+}$ content is desirably 10%, and more preferably 7%, 5%, 3% and 1%, in that order. The $Al^{3+}$ content may be 0%.

$Al^{3+}$ functions to improve the chemical durability and weatherability of the glass material. Whereas, if there is too much $Al^{3+}$ content, the thermal stability of the glass material deteriorates, and the glass transition temperature Tg increases so that the meltability easily decreases. Therefore, it is desirable for the $Al^{3+}$ content to be within the above-mentioned ranges.

In the glass material of the present disclosure, it is desirable for the lower limit of the total content $[P^{5+}+B^{3+}+Si^{4+}+Al^{3+}]$ of $P^{5+}$, $B^{3+}$, $Si^{4+}$ and $Al^{3+}$ to be 10%, and more preferably 15%, 18%, 20%, 23% and 25%, in that order. Furthermore, it is desirable for the upper limit of the total content $[P^{5+}+B^{3+}+Si^{4+}+Al^{3+}]$ to be 60%, and more preferably 50%, 45%, 40%, 37% and 35%, in that order.

The glass material of the present disclosure is desirably provided with a transition metal as a glass component, and preferably at least one glass component selected from the group consisting of Ti-ion, Nb-ion, W-ion, and Bi-ion; the Bi-ion is the most preferable out of this group.

In the glass material of the present disclosure, the lower limit of the Ti-ion content is desirably 1%, and more preferably 2% and 3%, in that order. Furthermore, the upper limit of the Ti-ion content is desirably 45%, and more preferably 40%, 35%, 30%, 25%, 20%, 15% and 12%, in that order. The Ti-ion includes $Ti^{4+}$, $Ti^{3+}$, and all Ti-ions of different valences.

The Ti-ion contributes greatly to achieving a high refractive index, in the same manner as a Nb-ion, a W-ion and a Bi-ion, and has a function of increasing the coloration of the glass material. Whereas, if there is too much Ti-ion content, there is a tendency for the meltability of the glass material to decrease, and for unmelted glass raw material to remain. Therefore, it is desirable for the Ti-ion content to be within the above-mentioned ranges.

In the glass material of the present disclosure, the lower limit of the Nb-ion content is desirably 1%, and more preferably 5%, 10% and 15%, in that order. Furthermore, the upper limit of the Nb-ion content is desirably 45%, and more preferably 40%, 35%, 30%, 25%, 23% and 20%, in that order. The Nb-ion includes $Nb^{5+}$, and all Nb-ions of different valences.

The Nb-ion contributes to achieving a high refractive index, and is a component that increases the coloration of the glass material. Furthermore, Nb-ion also has a function of improving the thermal stability and chemical durability of the glass material. However, if there is too much Nb-ion content, there is a tendency for the thermal stability of the glass material to decrease. Therefore, it is desirable for the Nb-ion content to be within the above-mentioned ranges.

In the glass material of the present disclosure, the upper limit of the W-ion content is desirably 30%, and more preferably 25%, 20%, 15% and 13%, in that order. Furthermore, the lower limit of the W-ion content is desirably 0.5%, and more preferably 1%, 2% and 3%, in that order. The W-ion includes $W^{6+}$, and all W-ions of different valences.

The W-ion contributes to achieving a high refractive index, and has a function of increasing the coloration of the glass material. Therefore, it is desirable for the W-ion content to be within the above-mentioned ranges.

In the glass material of the present disclosure, the upper limit of the Bi-ion content is desirably 40%, and more preferably 35%, 30%, 28% and 25%, in that order. Furthermore, the lower limit of the Bi-ion content is desirably 0.5%, and more preferably 1%, 2% and 2.5%, in that order. The Bi-ion includes $Bi^{3+}$, and all Bi-ions of different valences.

The Bi-ion contributes to achieving a high refractive index, and has a function of increasing the coloration of the glass material. Therefore, it is desirable for the Bi-ion content to be within the above-mentioned ranges.

In the glass material of the present disclosure, it is desirable for the lower limit of the total content [Ti+Nb+W] of the Ti-ion, the Nb-ion and the W-ion to be 1%, and more preferably 5%, 10%, 15%, 20% and 23%, in that order. Furthermore, it is desirable for the upper limit of the total content [Ti+Nb+W] to be 60%, and more preferably 55%, 50%, 45%, 40%, 38% and 35%, in that order.

In the glass material of the present disclosure, it is desirable for the upper limit of the total content [Ti+Nb+W+Bi] of the Ti-ion, the Nb-ion, the W-ion and the Bi-ion to be 80%, and more preferably 75%, 70%, 68% and 65%, in that order. Furthermore, it is desirable for the lower limit of the total content [Ti+Nb+W+Bi] to be 1%, and more preferably 5%, 10%, 15%, 20%, 23% and 25%, in that order.

In the glass material of the present disclosure, it is desirable for the lower limit of the cation ratio [(Ti+Nb+W+Bi)/($P^{5+}+B^{3+}+Si^{4+}$)] of the total content of the Ti-ion, the Nb-ion, the W-ion and the Bi-ion with respect to the total content of $P^{5+}$, $B^{3+}$ and $Si^{4+}$ to be 0.1, and more preferably 0.3, 0.5, 0.6 and 0.7, in that order. Furthermore, it is desirable for the upper limit of the cation ratio [(Ti+Nb+W+Bi)/($P^{5+}+B^{3+}+Si^{4+}$)] to be 4.0, and more preferably 3.5, 3.0, 2.7 and 2.5, in that order.

In the glass material of the present disclosure, the upper limit of the $Ta^{5+}$ content is desirably 5%, and more preferably 3%, 2% and 1%, in that order. The $Ta^{5+}$ content may be 0%.

$Ta^{5+}$ has a function of improving the thermal stability of the glass material. Whereas, if there is too much $Ta^{5+}$ content, there is a tendency for the glass material to have a decreased refractive index and for the meltability of the glass material to decrease. Therefore, it is desirable for the $Ta^{5+}$ content to be within the above-mentioned ranges.

In the glass material of the present disclosure, the upper limit of the $Li^+$ content is desirably 35%, and more preferably 30%, 27%, 25%, 23% and 20%, in that order. Furthermore, the lower limit of the $Li^+$ content is desirably 1%, and more preferably 2%, 3%, 5% and 8%, in that order. The $Li^+$ content may be 0%.

In the glass material of the present disclosure, the upper limit of the $Na^+$ content is desirably 40%, and more preferably 35%, 30%, 25%, 20% and 18%, in that order. Furthermore, the lower limit of the $Na^+$ content is desirably 0.5%, and more preferably 1%, 1.5%, 3% and 5%, in that order. The $Na^+$ content may be 0%.

Including $Li^+$ or $Na^+$ in the glass material facilitates the chemical strengthening process on the glass material. However, if there is too much $Li^+$ or $Na^+$ content, there is a risk that the thermal stability of the glass material decreases. Therefore, it is desirable for each $Li^+$ and $Na^+$ content to be within the above-mentioned ranges, respectively.

In the glass material of the present disclosure, it is desirable for the upper limit of the total content [$Li^++Na^+$] of the $Li^+$ and $Na^+$ to be 45%, and more preferably 43%, 40% and 38%, in that order. Furthermore, it is desirable for the lower limit of the total content [$Li^++Na^+$] to be 1%, and more preferably 5%, 10%, 15% and 20%, in that order.

In the glass material of the present disclosure, the upper limit of the $K^+$ content is desirably 20%, and more preferably 15%, 13%, 10%, 8%, 5% and 3%, in that order. Furthermore, the lower limit of the $K^+$ content is desirably 0.1%, and more preferably 0.5%, 1.0% and 1.2%, in that order. The $K^+$ content may be 0%.

$K^+$ has a function of improving the thermal stability of the glass material. Whereas, if there is too much $K^+$ content, there is a tendency for the thermal stability of the glass material to decrease. Therefore, it is desirable for the $K^+$ content to be within the above-mentioned ranges.

In the glass material of the present disclosure, the upper limit of the $Rb^+$ content is desirably 5%, and more preferably 3%, 1% and 0.5%, in that order. The $Rb^+$ content may be 0%.

In the glass material of the present disclosure, the upper limit of the $Cs^+$ content is desirably 5%, and more preferably 3%, 1% and 0.5%, in that order. The $Cs^+$ content may be 0%.

$Rb^+$ and $Cs^+$ both have a function of improving meltability of the glass material. However, if there is too much $Rb^+$ and/or $Cs^+$ content, the refractive index nd decreases, and there is a risk of the volatility of the glass components increase during melting. Therefore, it is desirable for each $Rb^+$ and $Cs^+$ content to be within the above-mentioned ranges, respectively.

In the glass material of the present disclosure, the upper limit of the $Mg^{2+}$ content is desirably 15%, and more preferably 10%, 5%, 3% and 1%, in that order. The $Mg^{2+}$ content may be 0%.

In the glass material of the present disclosure, the upper limit of the $Ca^{2+}$ content is desirably 15%, and more preferably 10%, 5%, 3% and 1%, in that order. The $Ca^{2+}$ content may be 0%.

In the glass material of the present disclosure, the upper limit of the $Sr^{2+}$ content is desirably 15%, and more preferably 10%, 5%, 3% and 1%, in that order. The $Sr^{2+}$ content may be 0%.

In the glass material of the present disclosure, the upper limit of the $Ba^{2+}$ content is desirably 25%, and more preferably 20%, 18%, 15%, 10% and 5%, in that order. The $Ba^{2+}$ content may be 0%.

$Mg^{2+}$, $Ca^{2+}$, $Sr^{2+}$ and $Ba^{2+}$ each having a function of improving thermal stability and improving meltability of the glass material. However, if there is too much content of any of $Mg^{2+}$, $Ca^{2+}$, $Sr^{2+}$ and $Ba^{2+}$, high refractive index properties are lost, and there is a risk of the thermal stability of the glass material decreasing. Therefore, it is desirable for each $Mg^{2+}$, $Ca^{2+}$, $Sr^{2+}$ and $Ba^{2+}$ content to be within the above-mentioned ranges, respectively.

In the glass material of the present disclosure, it is desirable for the upper limit of the total content [$Mg^{2+}+Ca^{2+}+Sr^{2+}+Ba^{2+}$] of $Mg^{2+}$, $Ca^{2+}$, $Sr^{2+}$ and $Ba^{2+}$ to be 30%, and more preferably 25%, 20%, 18%, 15%, 10% and 5%, in that order.

In the glass material of the present disclosure, the upper limit of the $Zn^{2+}$ content is desirably 15%, and more preferably 10%, 8%, 5%, 3% and 1%, in that order. Furthermore, the lower limit of the $Zn^{2+}$ content is desirably 0.1%, and more preferably 0.3% and 0.5%, in that order. The $Zn^{2+}$ content may be 0%.

$Zn^{2+}$ has a function of improving the thermal stability of the glass material. Whereas, if there is too much $Zn^{2+}$ content, there is a tendency for the meltability of the glass material to deteriorate. Therefore, it is desirable for the $Zn^{2+}$ content to be within the above-mentioned ranges.

In the glass material of the present disclosure, the upper limit of the $Zr^{4+}$ content is desirably 5%, and more preferably 3%, 2% and 1%, in that order. The $Zr^{4+}$ content may be 0%.

$Zr^{4+}$ has a function of improving the thermal stability of the glass material. Whereas, if there is too much $Zr^{4+}$ content, there is a tendency for the thermal stability and the meltability of the glass material to deteriorate. Therefore, it is desirable for the $Zr^{4+}$ content to be within the above-mentioned ranges.

In the glass material of the present disclosure, the upper limit of the $Ga^{3+}$ content is desirably 3%, and more preferably 2% and 1%, in that order. Furthermore, the lower limit of the $Ga^{3+}$ content is desirably 0%. The $Ga^{3+}$ content may be 0%.

In the glass material of the present disclosure, the upper limit of the $In^{3+}$ content is desirably 3%, and more preferably 2% and 1%, in that order. Furthermore, the lower limit of the $In^{3+}$ content is desirably 0%. The $In^{3+}$ content may be 0%.

In the glass material of the present disclosure, the upper limit of the $Sc^{3+}$ content is desirably 3%, and more preferably 2% and 1%, in that order. Furthermore, the lower limit of the $Sc^{3+}$ content is desirably 0%. The $Sc^{3+}$ content may be 0%.

In the glass material of the present disclosure, the upper limit of the $Hf^{4+}$ content is desirably 3%, and more preferably 2% and 1%, in that order. Furthermore, the lower limit of the $Hf^{4+}$ content is desirably 0%. The $Hf^{4+}$ content may be 0%.

In the glass material of the present disclosure, the upper limit of the $Lu^{3+}$ content is desirably 3%, and more preferably 2% and 1%, in that order. Furthermore, the lower limit of the $Lu^{3+}$ content is desirably 0%. The $Lu^{3+}$ content may be 0%.

In the glass material of the present disclosure, the upper limit of the $Ge^{4+}$ content is desirably 3%, and more preferably 2% and 1%, in that order. Furthermore, the lower limit of the $Ge^{4+}$ content is desirably 0%. The $Ge^{4+}$ content may be 0%.

In the glass material of the present disclosure, the upper limit of the $La^{3+}$ content is desirably 5%, and more preferably 4% and 3%, in that order. Furthermore, the lower limit of the $La^{3+}$ content is desirably 0%. The $La^{3+}$ content may be 0%.

In the glass material of the present disclosure, the upper limit of the $Gd^{3+}$ content is desirably 5%, and more preferably 4% and 3%, in that order. Furthermore, the lower limit of the $Gd^{3+}$ content is desirably 0%. The $Gd^{3+}$ content may be 0%.

In the glass material of the present disclosure, the upper limit of the $Y^{3+}$ content is desirably 5%, and more preferably 4% and 3%, in that order. Furthermore, the lower limit of the $Y^{3+}$ content is desirably 0%. The $Y^{3+}$ content may be 0%.

In the glass material of the present disclosure, the upper limit of the $Yb^{3+}$ content is desirably 3%, and more preferably 2% and 1%, in that order. Furthermore, the lower limit of the $Yb^{3+}$ content is desirably 0%. The $Yb^{3+}$ content may be 0%.

It is desirable for the cation components of the glass material of the present disclosure to be formed from mainly the above-mentioned components, namely, $P^{5+}$, $B^{3O}$, $Si^{4+}$, $Al^{3+}$, Ti-ion, Nb-ion, W-ion, Bi-ion, $Ta^{5+}$, $Li^+$, $Na^+$, $K^+$, $Rb^+$, $Cs^+$, $Mg^{2+}$, $Ca^{2+}$, $Sr^{2+}$, $Ba^{2+}$, $Zn^{2+}$, $Zr^{4+}$, $Ga^{3+}$, $In^{3+}$, $Sc^{3+}$, $Hf^{4+}$, $Lu^{3+}$, $Ge^{4+}$, $La^{3+}$, $Gd^{3+}$, $Y^{3+}$ and $Yb^{3+}$. It is desirable for the total content of the above-mentioned components to be greater than 95%, more preferably greater than 98%, more preferably greater than 99%, and even more preferably greater than 99.5%.

The glass material of the present disclosure may include a component, other than $F^-$ and $O^{2-}$, as an anion component. Examples of anion components, other than $F^-$ and $O^{2-}$, are $Cl^-$, $Br^-$ and $I^-$. However, each of $Cl^-$, $Br^-$ and $I^-$ can easily volatize during melting of the glass material. The volatizing of these components causes problems such as: the properties of the glass material fluctuating, the homogeneity of the glass material decreasing, and wear and tear occurring in the melting equipment becomes prominent. Accordingly, it is desirable for the $Cl^-$ content to be less than 5 anion %, and more preferably less than 3 anion %, more preferably less than 1 anion %, more preferably less than 0.5 anion %, and even more preferably 0.25 anion %. Furthermore, it is desirable the total content of $Br^-$ and $I^-$ to be less than 5 anion %, and more preferably less than 3 anion %, more preferably less than anion %, more preferably less than 0.5 anion %, more preferably less than 0.1 anion %, and even more preferably 0 anion %.

Note that anion % refers to a mol percentage with the content of all anions totaling to 100%.

Although it is desirable for the glass material of the present disclosure to be fundamentally formed from the above-mentioned components, it is possible for other components to also be included within a range that does not impede the functional effects of the illustrated Examples.

The glass material of the present disclosure may, for example, further include an appropriate amount of copper (Cu) as a glass component to contribute to near-infrared light absorbing properties of the glass material. V, Cr, Mn, Fe, Co, Ni, Pr, Nd, Pm, Sm, Eu, Tb, Dy, Ho, Er, Tm or Ce, etc., may also be included in the glass material. These elements increase the coloration of the colored layer, and can be a generation source for fluorescence excitation.

The illustrated examples of the present disclosure do not exclude unavoidable impurities.

<Other Component Compositions>

Pb, As, Cd, Tl, Be and Se each have toxicity. Therefore, it is desirable not to include these elements as glass components in the glass material of the present disclosure.

U, Th and Ra each are radioactive elements. Therefore, it is desirable not to include these elements as glass components in the glass material of the present disclosure.

$Sb^{3+}$, $Sn^{4+}$ and $Ce^{4+}$ are glass components, which can be added as desired, and function as a fining agent. Out of these components, $Sb^{3+}$ produces the greatest fining effect.

The $Sb^{3+}$ content is converted to $Sb_2O_3$, and is indicated as a wt % external ratio. The external ratio indication refers to an indication in wt % of the $Sb_2O_3$ content when the content ratio of the cation components other than $Sb^{3+}$, $Sn^{4+}$ and $Ce^{4+}$ is converted to an oxide, in the same manner as $Sb_2O_3$, so that the total content ratio of all the cation components other than $Sb^{3+}$, $Sn^{4+}$ and $Ce^{4+}$ becomes 100 wt %. It is desirable for the content of $Sb_2O_3$ to be less than 2 wt %, and more preferably less than 1 wt %, more preferably less than 0.5 wt %, more preferably less than 0.2 wt %, more preferably less than 0.1 wt %, more preferably less than 0.05 wt %. The fining of the glass material can be improved by determining the content of $Sb_2O_3$ within the above-mentioned ranges.

Each content of $Sn^{4+}$ and $Ce^{4+}$ is converted into oxides and are indicated as external ratios. Namely, the content ratio of cation components other than $Sb^{3+}$, $Sn^{4+}$ and $Ce^{4+}$ are converted to oxides, and the content of $SnO_2$ and the content of $CeO_2$ are indicated as wt % when the total content ratios of all the cation components other than $Sb^{3+}$, $Sn^{4+}$ and $Ce^{4+}$ becomes 100 wt %. It is desirable for the content of $SnO_2$ and $CeO_2$ to be respectively less than 2 wt %, and more preferably less than 1 wt %, more preferably less than 0.5 wt %, and more preferably less than 0.1 wt %. Each content of $SnO_2$ and $CeO_2$ maybe 0 wt %. The fining of the glass material can be improved by determining each content of $SnO_2$ and $CeO_2$ within the above-mentioned ranges.

[Manufacture of Glass Material]

The glass material of the present disclosure is obtained by producing a glass material with no coloration, and thereafter forming a colored layer. The glass material (glass element) with no coloration may be produced in accordance with a known glass manufacturing method. For example, a glass material can be obtained by mixing a plurality of different types of compounds, which are sufficiently mixed to produce a batch of raw materials, this batch of raw materials is introduced into a melting vessel to be melted, via which molten glass is formed after fining and homogenization, and is gradually cooled to produce to a glass material. Alternatively, the batch of raw materials is introduced into a melting vessel and rough melted. The molten material obtained by rough melting is rapidly cooled, and formed into a cullet. Thereafter, the cullet is inserted into the melting vessel, and is heated and re-melted to become molten glass, in which molten glass is molded after fining and homogenization, and is gradually cooled to produce to a glass material. A known method may be applied for the molding and gradual cooling of the molten glass.

Furthermore, in the manufacturing process of the glass material of the illustrated Examples, a process for increasing the amount of moisture within the molten glass may be included. Examples of processes for increasing the amount of moisture within the molten glass may be: a process of adding steam in a melting atmosphere, or a process of bubbling gas that includes steam within the molten material. Out of these two methods, it is desirable to include the process of adding steam in a melting atmosphere. By including a process for increasing the amount of moisture within the molten glass, the βOH value of the glass material can be increased. By increasing the βOH value of the glass material, a glass material having a higher transparency can be achieved.

[Formation of Colored Layer]

A colored layer can be formed by applying a metallic film onto the glass surface (of the glass element) and subjecting the metallic film to a heat treatment in a reduction atmosphere.

It is desirable for the metal used to form the metallic film to be a metal that occludes hydrogen ions in the atmosphere, and has a function of reducing the glass components included in the glass material via the transfer of hydrogen ions and electrons. Furthermore, a metal having a function of reducing a transition metal out of the glass components is more preferable. Specifically, e.g., Au, Ag, Pt, Ni and Pt—Pd alloy, etc.

Although there are no particular limitations regarding the method of applying the metallic film onto the glass surface, providing that the metallic film can adhere onto the glass surface, possible examples are, e.g., evaporated deposition, sputtering, or applying a metallic paste.

The reduction atmosphere is only required to include a gas that has reducing power. An example of a gas having reducing power is hydrogen. Accordingly, it is desirable to use a hydrogen-containing gas as a reduction atmosphere, and a forming gas containing hydrogen may be used. A forming gas is a mixed gas of hydrogen and nitrogen, and normally includes about 3 through 5 vol % of hydrogen.

The heat treatment process is carried out by heating at a temperature greater than or equal to a temperature that is 200° C. lower than the glass transition temperature Tg (Tg −200) and less than or equal to the softening point temperature. The heat treatment process can be appropriately adjusted in accordance with a desired coloration, range (area) of the colored layer, and thickness of the colored layer, etc.

After the heat treatment process, the metallic film is detached from the glass surface. Although there are no particular restrictions on the method of detaching the metallic film, detaching methods such as polishing or melting may be used.

Due to the heat treatment process in a reduction atmosphere, a colored layer is formed from the glass surface, which is in contact with the metallic film, to inside the glass material (glass element).

Although there are no particular restrictions regarding the reduction mechanism involved in the formation of the colored layer via the above-mentioned methods, the following describes a conceivable method.

The coloration of the colored layer formed in the illustrated Examples is understood as being a reduction pigment occurring in the glass component, namely, a reduction pigment occurring in the transition metal. Usually, even if a glass molded body were to be subject to a heat treatment process in a reduction atmosphere that includes a low concentration of hydrogen, of approximately 3 through 5 vol %, hardly any reduction pigment would be present in the glass molded body. However, since the above-described metallic film occludes hydrogen ions in the atmosphere, a large amount of hydrogen ions are supplied to the portion of glass material that is in contact with the metallic film, compared to the portion of the glass material that is not in contact with the metallic film, resulting in the reduction reaction rapidly progressing. Accordingly, the portion of the glass material that is in contact with the metallic film is densely colored. The occlusion amount of hydrogen ions by the metallic film is great, insomuch as to lower the hydrogen concentration in the atmosphere due to the occlusion of the metallic film; hence, the progress of the reduction reaction at the portion of the glass material that is not in contact with the metallic film is also hindered due to this reason.

The reduction reaction of the glass components that causes coloration progresses in various directions from the portion of the glass material that is in contact with the metallic film. In other words, upon observing a cross section of the glass material, the colored layer is formed in the thickness direction from the surface of the glass material to which the metallic film is in contact, and upon observing from (above) the surface of the glass material, the colored layer is formed radially from the surface of the glass material to which the metallic film is in contact.

According to the above-described method, a colored layer having a denser coloration can be formed. Accordingly, even if the thickness of the colored layer is small, the transparency can be sufficiently decreased. If the thickness of the colored layer is small, the range (area) of the colored layer that is formed radially from the portion of the glass material that was in contact with the metallic film is also small when observed from (above) the surface of the glass material. In other words, according to the illustrated Examples, by adjusting the formation conditions of the colored layer, a colored layer having substantially the same shape (when observed from the surface of the glass material) as the metallic film can be formed.

[Manufacture of Optical Element]

An optical element formed from a glass material of the present disclosure is obtained by preparing (producing) an optical element having no coloration, and forming a colored layer on/in the optical element. The optical element having no coloration can be produced via a known manufacturing method; for example, by pouring molten glass into a casting mold to form a tablet shape, thereby producing the glass material. The obtained glass material can be appropriately, cut, ground and polished to produce a cut piece having a shape and size suitable for press molding. The cut piece is thereafter heated, softened, press-molded via a known method (reheat press forming), thereby producing an optical element blank having a shape (profile) close to the shape (profile) of the target optical element. The optical element blank is annealed, is ground and polished by a known method, to thereby produce an optical element. Alternatively, a precision press-molding glass gob or preform can be produced according to a known manufacturing method, in which a heated and softened glass gob or preform is precision press-molded in an optical-element molding die, to thereby produce an optical element.

A colored layer can be formed in the produced optical element by the above-described method. The colored layer may be formed at a stage during the production of the optical element.

An anti-reflection coating or a total reflection coating may be applied (coated) on the optical function surface of the produced optical element in accordance with intended use.

According to the present disclosure, an optical element formed from the above-described glass material can be provided. Examples of different types of the optical element are: a spherical lens element, an aspherical lens element, a prism, and diffraction grating lens element, etc. Examples of different shapes (profiles) the lens element are: a biconvex lens element, a planoconvex lens element, a biconcave lens element, a planoconcave lens element, a convex meniscus lens element, and a concave meniscus lens element, etc. The optical element can be manufactured according to a method including the process of machining a glass molded body formed from the above-described glass material. Examples of a machining process are: cutting, milling, rough grinding, precision grinding, polishing, and precision press-forming, etc.

An optical element for shielding light obliquely incident on a light receiving surface of an imaging sensor such as a CCD or a C-MOS sensor can be shown as an example of the optical element. Conventionally, in order to shield (block) the light that is obliquely incident on the light receiving surface of the imaging sensor, a method has been used in which black ink is applied to a portion of a cover glass surface of the imaging sensor where it is desired to shield the obliquely incident light so as to have a light shielding property. In this method, light is reflected on the surface of the black ink at the boundary between the portion where the black ink is applied and the portion where the black ink is not applied, resulting in stray light and degrading of the image quality of the imaging sensor. Furthermore, a temperature rise causes degassing from the ink, which causes clouding on the surface of the cover glass. Whereas, if the cover glass is formed by using the glass material of the present disclosure and providing a colored layer at a portion(s) where it is desired to shield the obliquely incident light, the problem of stray light and the problem of clouding due to degassing can be resolved.

EXAMPLES

The following is a detailed description of the Examples pertaining to the present disclosure; however, the present invention is not limited to these Examples.

A glass sample having the glass composition shown in Table 1 was prepared by the following procedure and various evaluations were performed.

TABLE 1

| | No. | No. 1 | No. 2 | No. 3 |
|---|---|---|---|---|
| Cation % | $Si^{4+}$ | 0.0 | 0.0 | 0.0 |
| | $B^{3+}$ | 2.9 | 0.0 | 6.5 |
| | $P^{5+}$ | 28.0 | 27.2 | 26.3 |
| | $Li^+$ | 8.5 | 0.0 | 19.7 |
| | $Al^{3+}$ | 0.0 | 0.0 | 0.0 |
| | $Na^+$ | 8.0 | 1.9 | 16.4 |
| | $K^+$ | 1.9 | 1.4 | 2.3 |
| | $Mg^{2+}$ | 0.0 | 0.0 | 0.0 |
| | $Ca^{2+}$ | 0.0 | 0.0 | 0.0 |
| | $Sr^{2+}$ | 0.0 | 0.0 | 0.0 |
| | $Ba^{2+}$ | 0.8 | 4.0 | 0.5 |
| | $Zn^{2+}$ | 0.0 | 0.0 | 0.9 |
| | Ti-ion | 4.0 | 10.4 | 3.0 |
| | Nb-ion | 19.5 | 19.4 | 19.0 |
| | W-ion | 4.0 | 11.0 | 2.7 |
| | Bi-ion | 22.4 | 24.7 | 2.7 |
| | $Ta^{5+}$ | 0.0 | 0.0 | 0.0 |
| | $Zr^{4+}$ | 0.0 | 0.0 | 0.0 |
| | $La^{3+}$ | 0.0 | 0.0 | 0.0 |
| | $Gd^{3+}$ | 0.0 | 0.0 | 0.0 |
| | $Y^{3+}$ | 0.0 | 0.0 | 0.0 |
| | $Yb^{3+}$ | 0.0 | 0.0 | 0.0 |
| | Total | 100 | 100 | 100 |
| | $B^{3+}/P^{5+}$ | 0.104 | 0.000 | 0.247 |
| | $P^{5+} + B^{3+} + Si^{4+} + Al^{3+}$ | 30.9 | 27.2 | 32.8 |
| | Ti + Nb + W + Bi | 49.9 | 65.5 | 27.4 |
| | Ti + Nb + W | 27.5 | 40.8 | 24.7 |
| | (Ti + Nb + W + Bi)/ ($P^{5+} + B^{3+} + Si^{4+}$) | 1.615 | 2.408 | 0.835 |
| | $Li^+ + Na^+$ | 16.5 | 1.9 | 36.1 |
| | $Mg^{2+} + Ca^{2+} + Sr^{2+} + Ba^{2+}$ | 0.8 | 4.0 | 0.5 |
| Mass % (External Ratio) | $Sb_2O_3$ | 0.1 | 0.02 | 0.01 |
| Properties | Refractive Index nd | 2.00 | 2.10 | 1.82 |
| | Specific Gravity (g/cm³) | 5.1 | 5.6 | 3.7 |
| | Tg (° C.) | 479 | 561 | 454 |
| | Coefficient of Expansion (×10⁻⁷/K) | 101 | 82 | 121 |
| | Acid Durability Weight Reduction Rate (Da) | Grade 1 | Grade 1 | Grade 1 |

[Manufacture of Glass Material]

Oxides, hydroxides, metaphosphates, carbonates, and nitrates corresponding to the constituent components of the glass material were prepared as raw materials, and the raw materials are weighed and prepared so that the compositions of the obtained glass material correspond to each composition shown in Table 1, and the raw materials were mixed well. The obtained prepared raw material (batch raw material) was put into a platinum crucible and heated at 1100 to 1450° C. for 2 to 3 hours to obtain molten glass. The molten glass was stirred for homogenization, fined, and then cast into a molding die that is preheated to an appropriate temperature. The cast glass was heat-treated for about 1 hour near the glass transition temperature Tg, and allowed to cool to room temperature in the furnace. A glass sample was obtained by machining to a size having a length of 40 mm, a width of 10 mm and a thickness of 1.0 mm, and precision polishing (optical polishing) both 40 mm×10 mm surfaces.

[Confirmation of Glass Component Composition]

The content of each glass component of the obtained glass sample was measured by Inductively Coupled Plasma-Atomic Emission Spectrometry (ICP-AES), and it was confirmed that each glass composition was as shown in Table 1.

[Measurement of Optical Properties]

The refractive index nd, the specific gravity and the glass transition temperature Tg of the obtained glass sample were measured. The results are shown in Table 1.

(i) Refractive Index nd

The refractive index nd was measured by the refractive index measuring method of JIS standard JIS B 7071-1.

(ii) Specific Gravity

Specific gravity was measured by the Archimedes' method.

(iii) Glass Transition Temperature Tg

The glass transition temperature Tg was measured using a thermomechanical analyzer (TMA4000S), manufactured by MAC Science Ltd., at a temperature rising rate of 4° C./min.

[Average Linear Expansion Coefficient]

The average linear expansion coefficient was measured according to the Japan Optical Glass Manufacturers' Association standard JOGIS 08-2003 "Measuring method of thermal expansion of optical glass". The diameter of the round bar-shaped sample was 5 mm. The results are shown in Table 1.

[Acid durability weight reduction rate Da]

According to the Japan Optical Glass Manufacturers' Association standard JOGIS06-2009, the obtained glass sample was made into powdered glass (particle size 425 μm through 600 μm) having a weight corresponding to its specific gravity, was placed into a platinum basket, was soaked in 0.01 mol/L of nitric acid aqueous solution contained in a quartz glass round-bottomed flask and treated in a boiling water bath for 60 minutes, and the weight reduction rate (%) was measured before and after the treatment. The weight loss rate was evaluated by grade. The results are shown in Table 1.

Example 1

Formation of Colored Layer in Samples Having Different Glass Compositions

Example 1-1

A Pt—Pd film was formed into a pattern by sputtering on one surface of the optically polished surface of the glass sample having the glass composition of No. 1 out of the obtained glass sample (current during sputtering was 15 mA, film formation time was 900 sec).

The glass sample on which the Pt—Pd film was formed was heat treated at 400° C. for 5 hours while supplying a forming gas (3 vol % of hydrogen, 97 vol % of nitrogen) as a reduction atmosphere at a flow rate of 0.2 L/min.

The Pt—Pd film was detached by polishing, and a glass sample having a colored layer was obtained. The obtained glass sample is shown in FIG. 5-1.

[Measurement of Transmittance]

The external transmittance was measured at wavelengths of 300 nm through 2500 nm. The external transmittance is defined as a percentage [transmitted light intensity/incident light intensity×100] of the transmitted light intensity with respect to the incident light intensity when light is incident in the thickness direction of the glass sample. The external transmittance includes the reflection loss of light rays on the sample surface. The results are shown in FIG. 6-1. In FIG. 6-1, the broken line indicates the transmittance of the portion having the colored layer, and the solid line is the transmittance of the same portion before the formation of the colored layer.

[OD Measurement]

The incident light intensity $I_0$ and the transmitted light intensity I were measured for the portion having the colored layer at a wavelength of 1100 nm, and the OD (optical density) was calculated by the below-indicated formula. The OD before forming the colored layer at the same portion was calculated in the same manner. The results are shown in Table 2.

$$OD = -\log_{10}(I/I_o)$$

Example 1-2

A glass sample having a colored layer was obtained in the same manner as in Example 1-1, except that the glass sample having the glass composition of No. 2 was used. The obtained glass sample is shown in FIG. 5-2. The transmittance was measured in the same manner as in Example 1-1, and the results are shown in FIG. 6-2. The OD was measured in the same manner as in Example 1-1. The results are shown in Table 2.

Example 1-3

A glass sample having a colored layer was obtained in the same manner as in Example 1-1, except that the glass sample having the glass composition of No.3 was heat treated at 430° C. for 9 hours. The transmittance was measured in the same manner as in Example 1-1 and the results are shown in FIG. 6-3. The OD was measured in the same manner as in Example 1-1. The results are shown in Table 2.

TABLE 2

| Glass Sample | Before Formation of Colored Layer | After Formation of Colored Layer |
| --- | --- | --- |
| No. 1 | 0.1 | 4.0 |
| No. 2 | 0.1 | 0.9 |
| No. 3 | 0.1 | 2.1 |

Example 2

Formation of Colored Layers with Metallic Films Having Different Film Thicknesses Example 2-1

By adjusting the film forming conditions, Pt—Pd films having film thicknesses of 28 nm, 256 nm, 288 nm, and 420 nm were formed on one surface of the optically polished surface of the glass sample having the glass composition of No.3.

The glass sample on which the Pt—Pd film was formed was heat treated at 400° C. for 4 hours while supplying a forming gas (3 vol % of hydrogen, 97 vol % of nitrogen) as a reduction atmosphere at a flow rate of 0.2 L/min. The Pt—Pd film was detached by polishing, and a glass sample having a colored layer was obtained.

Figures 1, 7:
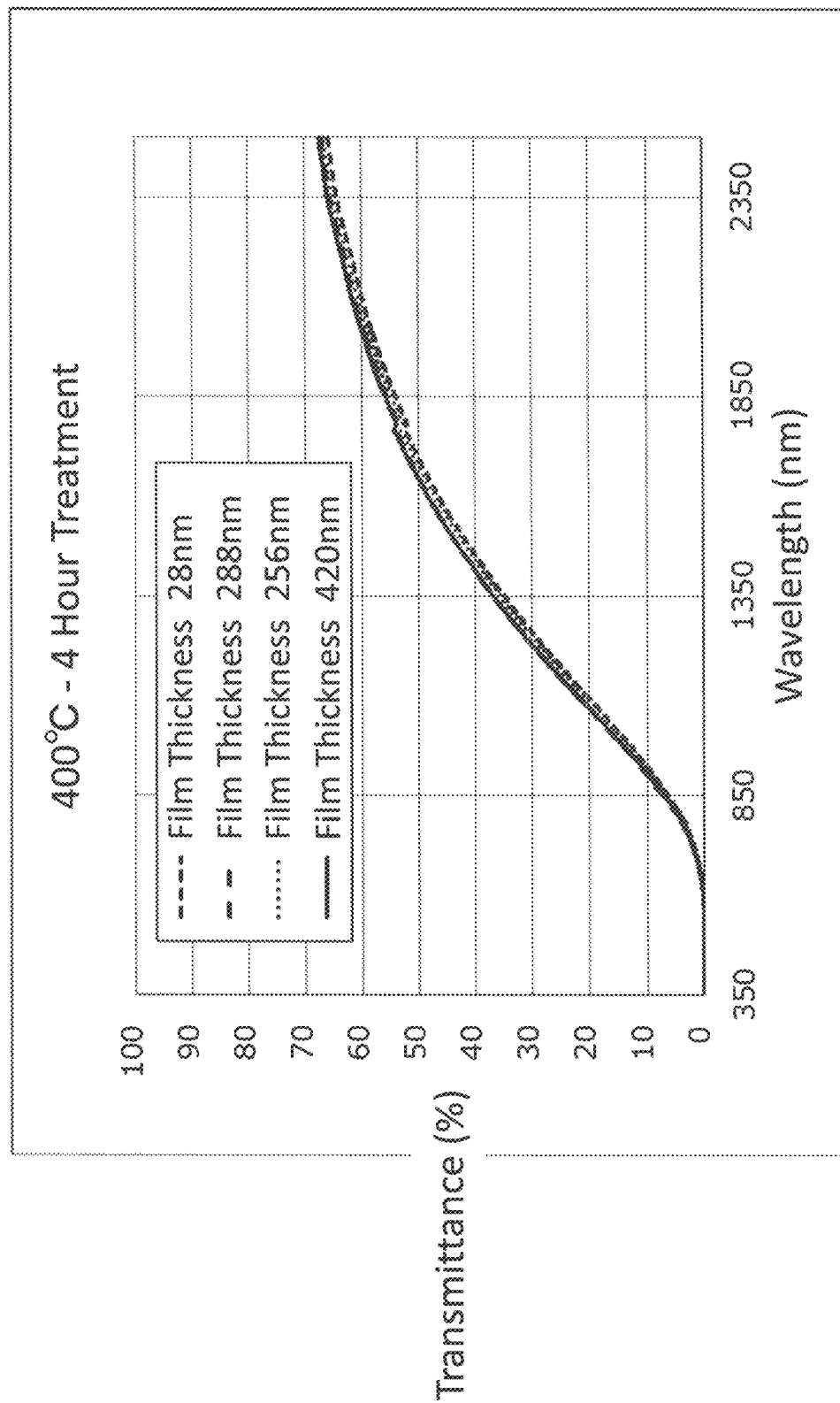
Figures 2, 7:
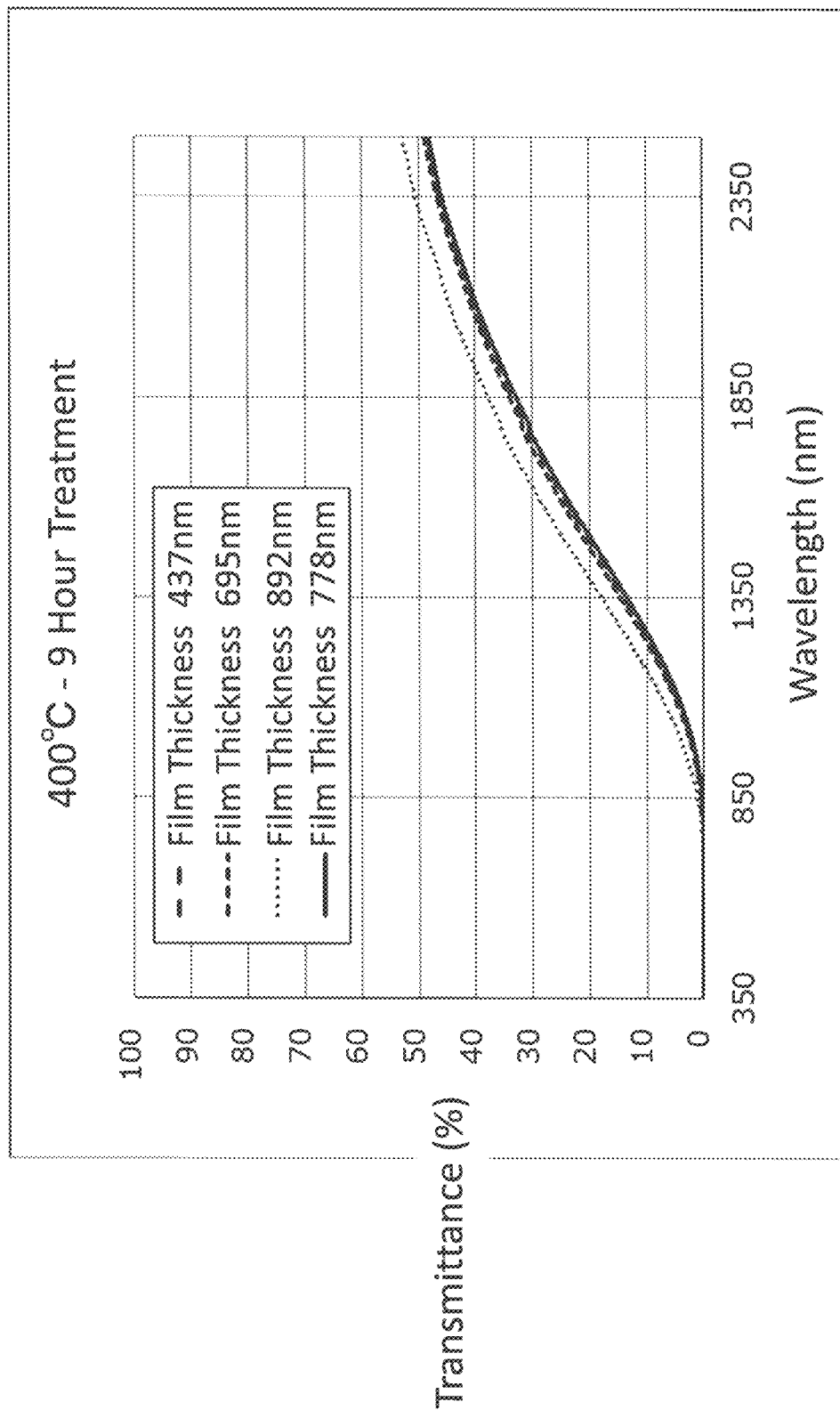

The transmittance of the portion having the colored layer was measured in the same manner as in Example 1-1. The relationship between the film thicknesses of the Pt—Pd films and the transmittance is shown in FIG. 7-1. The OD of the portion having the colored layer was measured in the same manner as in Example 1-1. FIG. 8 shows the relationship between the film thicknesses of the Pt—Pd films and the OD.

Example 2-2

By adjusting the film forming conditions, Pt—Pd films having film thicknesses of 437 nm, 695 nm, 778 nm, and 892 nm were formed on one surface of the optically polished surface of the glass sample having the glass composition of No.3.

The glass sample on which the Pt—Pd film was formed was heat treated at 400° C. for 9 hours while supplying a forming gas (3 vol % of hydrogen, 97 vol % of nitrogen) as a reduction atmosphere at a flow rate of 0.2 L/min. The Pt—Pd film was removed by polishing, and a glass sample having a colored layer was obtained.

The transmittance of the portion having the colored layer was measured in the same manner as in Example 2-1. The relationship between the film thickness of the Pt—Pd films and the transmittance is shown in FIG. 7-2. The OD of the portion having the colored layer was measured in the same manner as in Example 2-1. FIG. 8 shows the relationship between the film thicknesses of the Pt—Pd films and the OD.

It can be understood from FIGS. 7-1, 7-2, and 8 that the transmittance and the OD of the portion having the colored layer depended on the heat treatment time, rather than the thickness of the metal film.

Example 3

Formation of Colored Layers with Different Types of Metallic Films

Example 3-1

A glass sample having a colored layer was obtained in the same manner as in Example 1-1, except that Au films having a thickness of 15 nm and a thickness of 300 nm were formed on the optically polished surface of the glass sample having the glass composition of No.3 in place of the Pt—Pd film and was heat treated at 450° C. for 7 hours. The OD of the portion having the colored layer was measured in the same manner as in Example 1-1.

Example 3-2

A glass sample having a colored layer was obtained in the same manner as in Example 1-1, except that the Ag paste was applied to the optically polished surface of the glass sample having the glass composition of No.3 instead of forming the Pt—Pd film, and heat treatment was performed at 430° C. for 10 hours. The OD was measured in the same manner as in Example 3-1. The results are shown in Table 3.

TABLE 3

|  | Au Film | | Ag Paste |
| --- | --- | --- | --- |
| Film Thickness (nm) | 15 | 300 | — |
| OD | 0.69 | 4.22 | 0.642 |

Example 4

Cross-Section Observation of Glass Material with Colored Layer

Example 4-1

A Pt—Pd film was formed on one surface of the optically polished surface of the glass sample having the glass composition of No. 3. Furthermore, a part of the optically polished surface of the same sample was polished using No. 1000 (#1000) abrasive, and a Pt—Pd film was formed also on that part.

Thereafter, forming gas (3 vol % of hydrogen, 97 vol % of nitrogen) was supplied at a flow rate of 0.2 L/min, and heat treatment was performed at 400° C. for 5 hours. The Pt—Pd film was removed by polishing to obtain a glass sample having a colored layer.

The thickness of the colored layer was measured, and the results are shown in Table 4. Table 4 shows a micrograph of a cross section of the portion having a colored layer. In the micrograph of Table 4, the right side is the glass material, and the central black portion is the colored layer.

Example 4-2

An Au film was formed on one surface of the optically polished surfaces of the glass sample having the glass composition of No. 3. A glass sample having a colored layer was obtained in the same manner as in Example 4-1 except that heat treatment was performed at 450° C. for 7 hours.

Table 4 shows a micrograph of the thickness of the colored layer and the cross section of the portion having the colored layer. The OD of the portion having the colored layer was measured in the same manner as in Example 1-1. The results are shown in Table 4.

Example 4-3

An Au film was formed on one surface of the optically polished surfaces of the glass sample having the glass composition of No. 3. A glass sample having a colored layer was obtained in the same manner as in Example 4-2, except that the film formation time of the Au film was longer than that in Example 4-2.

Table 4 shows a micrograph of the thickness of the colored layer and the cross section of the portion having the colored layer. The OD was measured in the same manner as in Example 4-2. The results are shown in Table 4.

Example 4-4

A glass sample having a colored layer was obtained in the same manner as in Example 4-2 except that Pt—Pd films were formed on both surfaces of the optically polished surfaces of the glass sample having the glass composition of No. 3.

Table 4 shows a micrograph of the thickness of the colored layer and the cross section of the portion having the colored layer. The OD was measured in the same manner as in Example 4-2. The results are shown in Table 4.

TABLE 4

| Example | 4-1 | 4-2 | 4-3 | 4-4 |
|---|---|---|---|---|
| Color Layer Thickness (μm) | 46 (#1000 Polished Surface) 42 (Optically polished Surface) | 29 | 84 | 109 |
| OD (1100 nm) | — | 0.69 | 4.22 | >5 |

The surface polished using No. 1000 (#1000) abrasive has a greater surface roughness than the optically polished surface. It can be understood from Table 4 that the thickness of the colored layer formed varies depending on the surface roughness of the glass.

Example 5

Formation of a Colored Layer Having a Dot Pattern

A Pt—Pd film was formed in a dot pattern on the optically polished surface of the glass sample having the glass composition of No. 3; the details of which are as follows.

A metal plate was prepared that has a high level of flatness that is enough to cover the glass surface and has dot-patterned openings. The metal plate was adhered to the optically polished surface of the glass sample, and a Pt—Pd film was formed in the dot pattern openings.

Figure 9:
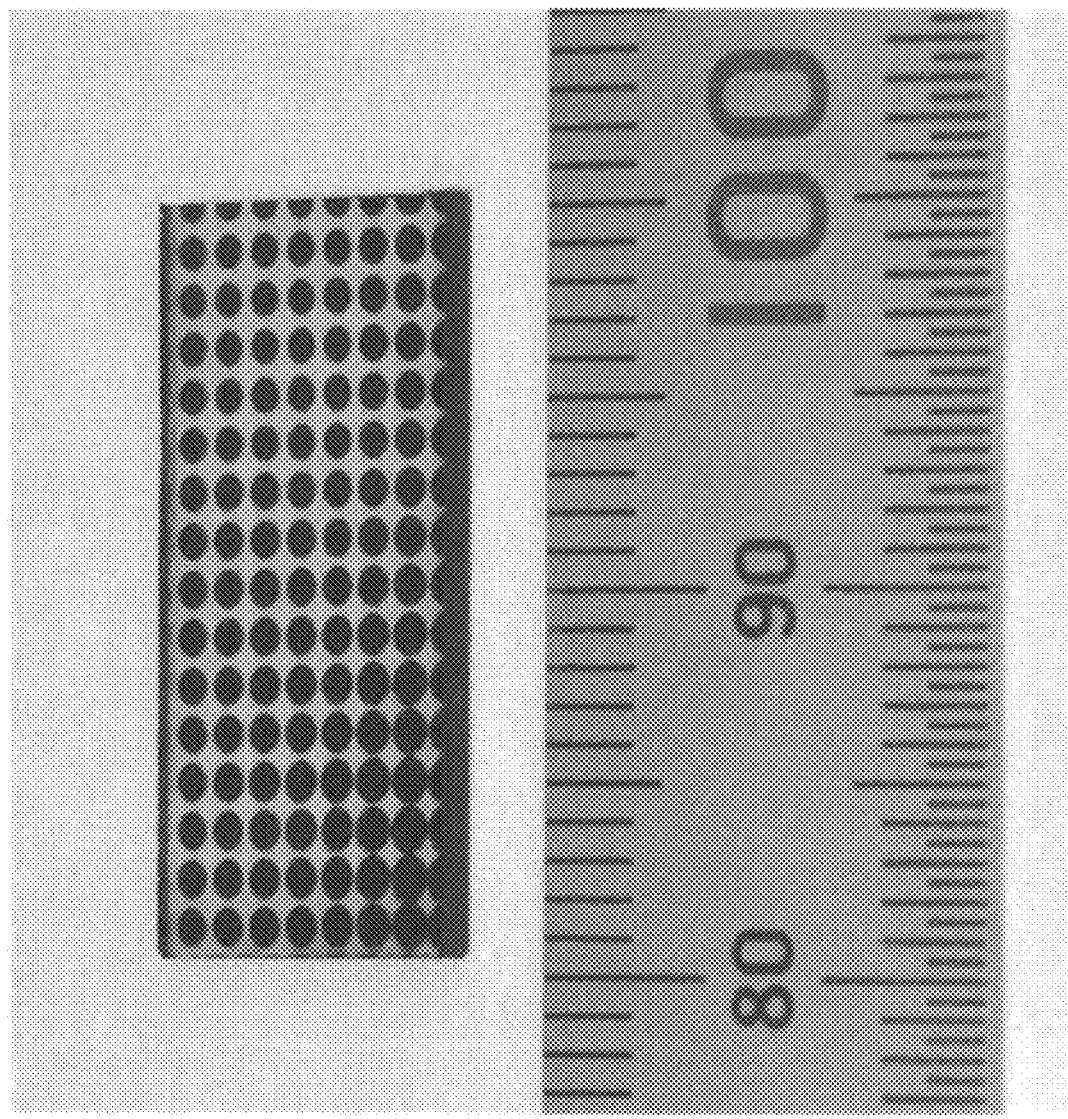
FIG. 9 is an image showing a sample of Example 5, and a ruler for reference.

Thereafter, the metal plate was removed, and the glass sample having the Pt—Pd film formed in the dot patterns was heat-treated in the same manner as in Example 1-3 to obtain a glass sample having a colored layer. The obtained glass sample is shown in FIG. 9.

Example 6

Change in Transmittance Due to Removal of Colored Layer

A glass sample having a colored layer was obtained in the same manner as in Example 1-3, except that the glass sample having the glass composition of No.3 was machined to have a thickness of 750 μm.

The cross section of the portion having the colored layer was observed with a microscope, and it was confirmed that the thickness of the colored layer was 110 μm. The OD of the portion having the colored layer was measured in the same manner as in Example 1-1. The results are shown in Table 5.

The obtained glass sample was polished from the surface having the colored layer so that the thickness of the glass sample was 660 μm, and the OD was measured for the same portion. The results are shown in Table 5.

Similarly, the glass sample was polished so that the thickness was 610 μm, 500 μm, and 380 μm, and the OD was measured for the same portion. Furthermore, the amount of change from the OD before polishing (without a polishing margin) was calculated. The OD results are shown in Table 5.

TABLE 5

| Thickness (μm) | 750 | 660 | 610 | 500 | 380 |
|---|---|---|---|---|---|
| Polishing Margin (μm) | 0 | 90 | 140 | 250 | 370 |
| OD (1100 nm) | 1.52 | 0.86 | 0.06 | 0.08 | 0.02 |
| Change in OD (1100 nm) | — | −0.66 | −1.45 | −1.44 | −1.49 |

According to Table 5, when the polishing margin of the glass sample exceeds 140 μm, the amount of change in OD becomes small. When the colored layer is removed by polishing, the glass sample has only a non-colored portion (a transparent area without coloration). Therefore, almost no change in the OD occurs even if the thickness is further reduced by polishing. Namely, the thickness of the colored layer of the glass sample is estimated to be more than 90 μm and less than 140 μm from the result of the amount of change in the OD due to polishing. This result agrees with the thickness (110 μm) of the colored layer based on the microscopic observation of the cross section. It should be noted that the increase/decrease in OD in the polishing margin range of 140 μm to 370 μm is negligible, and is considered to be within measurement error.

<<Specific Examples of Optical Element with Colored Layer on Glass Body>>

As shown in FIGS. 1 and 2, the optical element of the present embodiment has a glass body 1, and a colored layer 2 located inside the glass body 1 and outside the effective aperture of the optical element. The colored layer 2 is located from the surface of the glass body 1 to the inside thereof. Alternatively, the colored layer 2 may be located inside the glass body 1 instead of being located on the surface of the glass body 1.

By selectively forming the colored layer 2 inside the glass body 1 and outside the effective aperture of the optical element (outside the optical effective area), it is possible to exhibit a desired optical performance by shielding light in the portion where the colored layer 2 is present and transmitting light in the portion where the colored layer 2 is not present, as shown in FIG. 3 (FIG. 3-1, FIG. 3-2) and FIG. 4. In particular, the colored layer 2 suppresses the occurrence of stray light and obtains sufficient light-shielding properties, so that a superior image quality can be achieved.

The thickness of the colored layer 2 extending from the surface of the glass body 1 to the inside thereof is preferably 1 μm to 300 μm, more preferably 20 μm to 200 μm, and more preferably 30 μm to 150 μm. By satisfying this condition, the optical element can function favorably as an optical element including light shielding capability. If the lower limit of this condition is exceeded (if the thickness of the colored layer 2 is less than 1 μm), the light shielding capability of the colored layer 2 might not be sufficient. If the upper limit of this condition is exceeded (if the thickness of the colored layer 2 is larger than 300 μm), there is a risk that the colored layer extending toward the inside of the glass may shield off normal light (effective rays) depending on the part of the optical element forming the colored layer, so that the optical element would not sufficiently function as an optical element.

It is desirable for the colored layer 2 to have an optical density OD of 2.0 or more at a wavelength of 750 nm, and it is more preferable to have an optical density OD of 3.0 or more at a wavelength of 750 nm. In a wavelength range from the visible light range to the infrared range, the spectral transmittance of the colored layer 2 shows a tendency to increase as the wavelength becomes longer. When indicated as optical density OD, this tendency of the spectral transmittance is synonymous with the tendency for the optical density OD to decrease as the wavelength becomes longer. By satisfying the above conditions, the function of the optical element as an optical element including light shielding capability in the visible light region can be favorably exhibited. If the lower limit of this condition is exceeded (if the optical density OD of the colored layer 2 is less than 2.0 at a wavelength of 750 nm), the optical element (including light shielding capability) would not sufficiently function as an optical element.

<Applying the Optical Element to a Prism>

A case where the optical element of the present disclosure is applied to a prism 10 will be described with reference to FIGS. 10 through 13. The prism to which the optical element according to the present embodiment is applied is not limited to a rectangular prism; deflection prisms of various angles, pentaprisms, cubic prisms, etc., may also be used.

Figure 10:
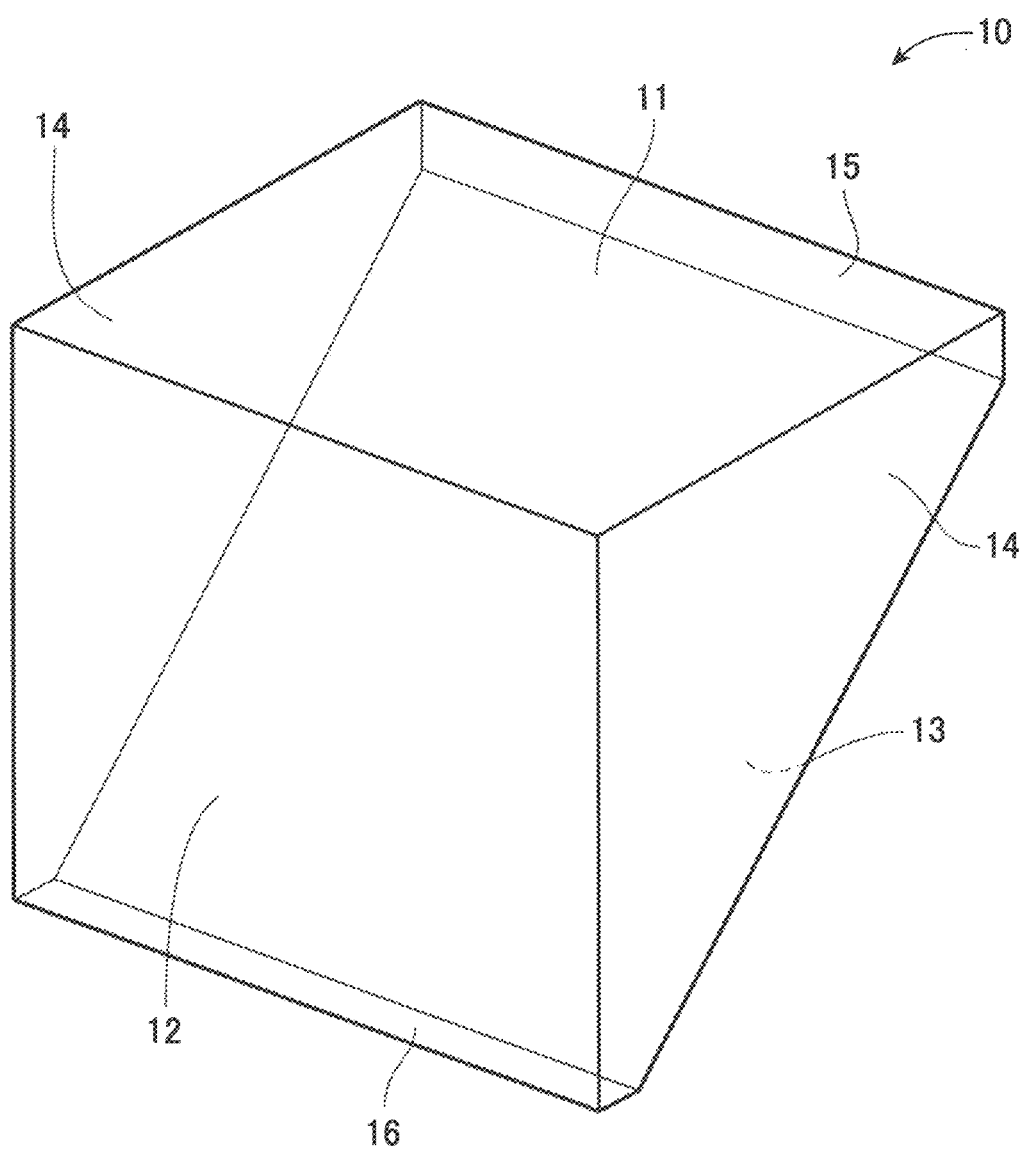
FIG. 10 is a perspective view showing an example of a prism structure as an optical element.

As shown in FIG. 10, the prism 10 is provided with an incident surface 11 for light (object-emanated light) to enter the prism 10, an exit surface 12, a reflection surface 13, and a side surface 14. A chamfered surface 15 is provided at the boundary between the incident surface 11 and the reflection surface 13, and a chamfered surface 16 is provided at the boundary between the exit surface 12 and the reflective surface 13. The positions where the chamfered surfaces 15 and 16 are provided are merely examples, and may be provided at any of the boundaries of the respective surfaces 11 to 14. Alternatively, all chamfered surfaces including the chamfered surfaces 15 and 16 may be omitted.

Light (object-emanating light) enters the prism 10 through various stray-light paths. In the present embodiment, in order to suppress the generation of stray light and obtain sufficient light shielding properties, the colored layer is provided on at least one of the incident surface 11, the exit surface 12, the reflection surface 13, the side surface 14, and the chamfered surfaces (the chamfered surfaces 15 and 16 in the present embodiment) at the boundary of any one of the surfaces 11 through 14 of the prism 10.

Figure 11A:
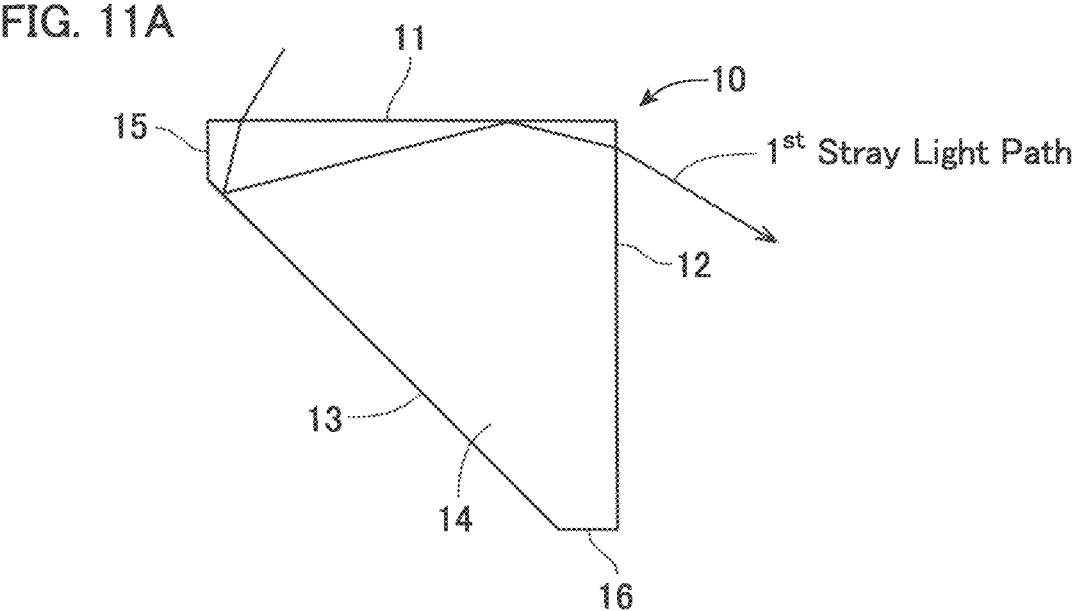
FIG. 11A is a schematic view indicating an example of a first stray-light path.
Figure 11B:
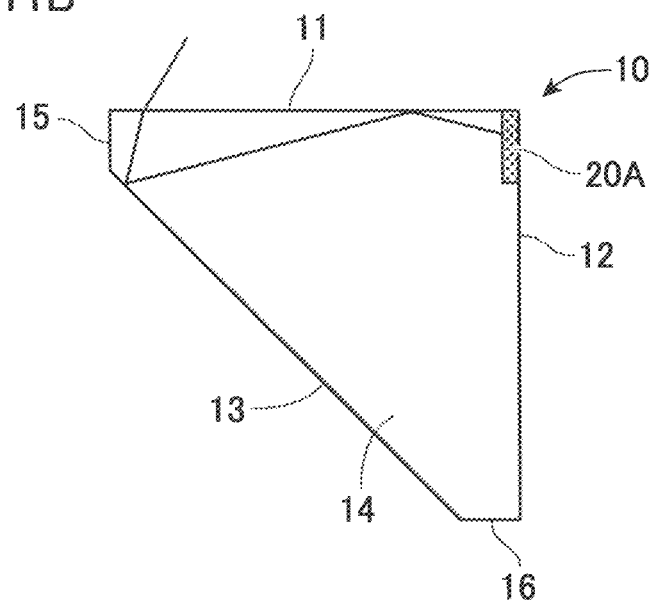
FIG. 11B is a schematic view indicating an example of a position of a colored layer and the corresponding first stray-light path.

FIG. 11A and FIG. 11B are schematic views showing an example of a first stray light path and an arrangement of the corresponding colored layer.

As shown in FIG. 11A, the first stray light path enters from the incident surface 11, is reflected by the reflection surface 13, is reflected by the incident surface 11, and exits out from the exit surface 12.

As shown in FIG. 11B, a colored layer 20A is provided from the surface of the exit surface 12 (of the prism 10) and toward the inside of the exit surface 12 so that the colored layer 20A is located in the first stray light path, and hence, the colored layer 20A absorbs the light (object-emanating light) that travels along the first stray light path.

Figure 12A:
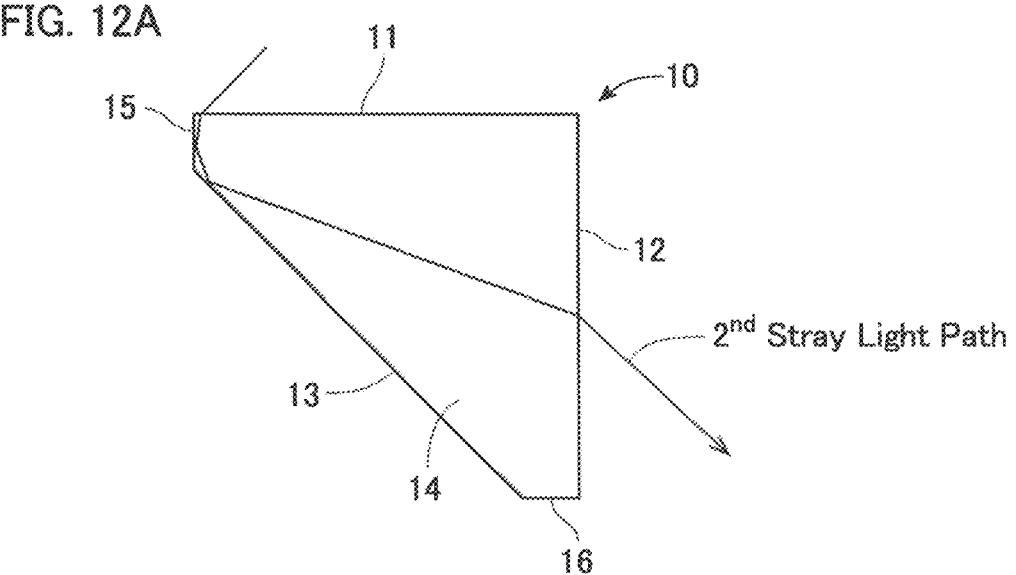
FIG. 12A is a schematic view indicating an example of a second stray-light path.
Figure 12B:
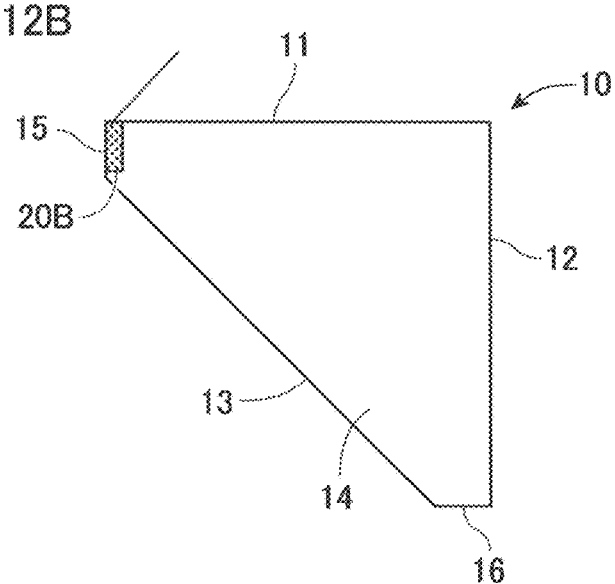
FIG. 12B is a schematic view indicating an example of a position of a colored layer and the corresponding second stray-light path.
Figure 12C:
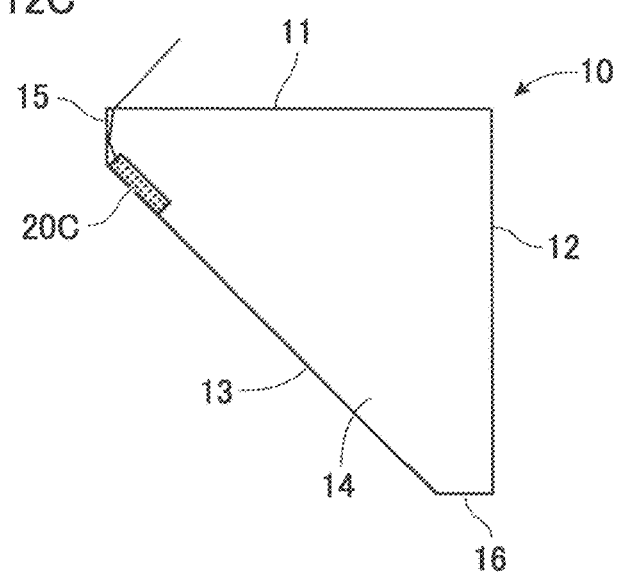
FIG. 12C is a schematic view indicating an example of another position of a colored layer and the corresponding second stray-light path.

FIGS. 12A through 12C are schematic views showing an example of a second stray light path and the arrangement of the corresponding colored layer.

As shown in FIG. 12A, the second stray light path enters from the incident surface 11, is reflected by the chamfered surface 15, is reflected by the reflection surface 13, and exits from the exit surface 12. If the chamfered surface 15 is formed as a rough surface, the light incident on the chamfered surface 15 becomes diffused light, however, from the viewpoint of considering the main component of the stray light, FIG. 12A depicts the specular reflection component of the light.

As shown in FIG. 12B, by providing a colored layer 20B on the inner side the chamfered surface 15 of the prism 10 so that the colored layer 20B is located in the second stray light path, the colored layer 20B absorbs the light (object-emanating light) that travels along the second stray light path.

As shown in FIG. 12C, by providing a colored layer 20C from a surface, outside the effective aperture, of the reflective surface 13 of the prism 10 toward the inside thereof and located in the second stray light path, the second colored layer 20C absorbs the light (object-emanating light) traveling along the second stray light path.

FIGS. 13A through 13E are perspective schematic views showing examples of arrangements of a third stray light path and corresponding colored layers.

Figure 13A:
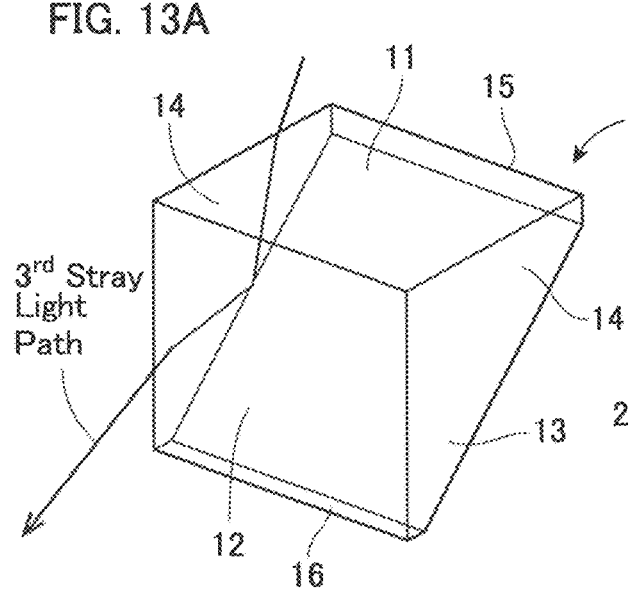
FIG. 13A is a perspective schematic view indicating an example of a third stray-light path.

As shown in FIG. 13A, the third stray light path enters from the incident surface 11, is reflected by the side surface 14, is reflected by the reflection surface 13, and exits from the exit surface 12.

Figure 13B:
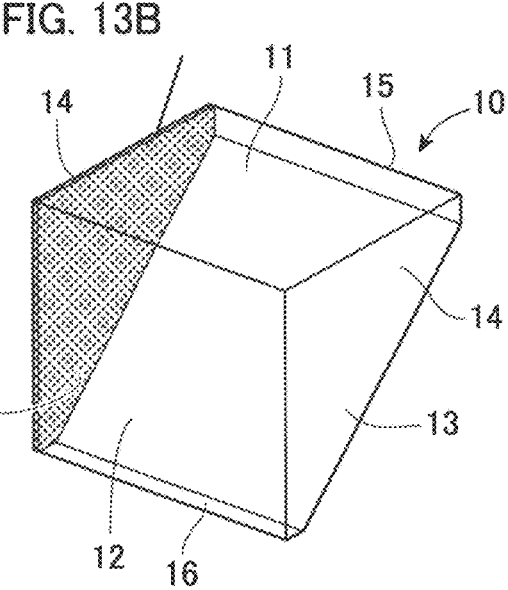
FIGS. 13B through 13E are perspective schematic views indicating examples of positions of colored layers and the corresponding third stray-light path.

As shown in FIG. 13B, by providing a colored layer 20D from the surface of the side surface 14 of the prism 10 toward the inside thereof and located in the third stray light path, the colored layer 20D absorbs the light (object-emanating light) traveling along the third stray light path. In FIG. 13B, although the third stray light path and the colored layer 20D are provided on one of the two side surfaces 14, the third stray light path and the colored layer 20D may be provided on the other of the two side surfaces 14. Alternatively, the third stray light path and the colored layer 20D may be provided on both of the two side surfaces 14.

Figure 13C:
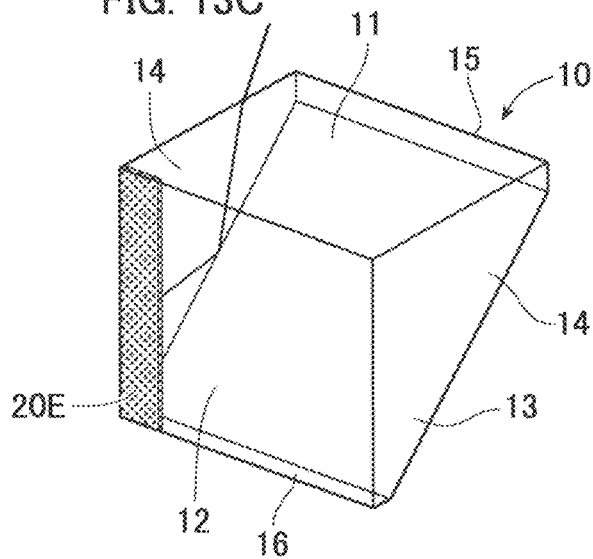

As shown in FIG. 13C, by providing a colored layer 20E from the surface of the exit surface 12 of the prism 10 toward the inside thereof and located in the third stray light path, the colored layer 20E absorbs light (object-emanating light) that travels along the third stray light path.

Figure 13D:
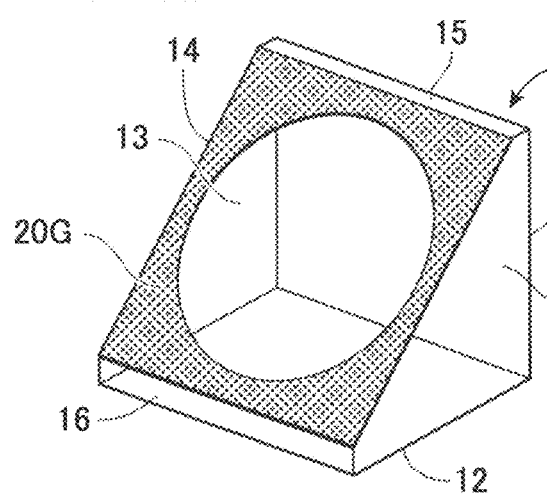

As shown in FIG. 13D, by providing a colored layer 20G from the surface, outside the effective aperture, of the reflective surface 13 of the prism 10 toward the inside thereof and located in the third stray light path, the third colored layer 20G absorbs the light (object-emanating light) traveling along the third stray light path. The colored layer 20G can prevent reflection (stray light) even if the reflective surface 13 is a mirror-finished surface portion. Furthermore, even if an adhesive, aluminum vapor deposition, silver vapor deposition, or the like, is applied onto the colored layer 20G, the light absorption properties are unchanged because the colored layer 20G exists inside the glass body. Since the reflecting surface 13 often totally reflects not only the effective light ray but also the stray light, it is effective as a countermeasure against stray light to provide the colored layer 20G outside the effective aperture of the reflecting surface 13 and formed therefrom toward the inside of the prism 10.

Figure 13E:
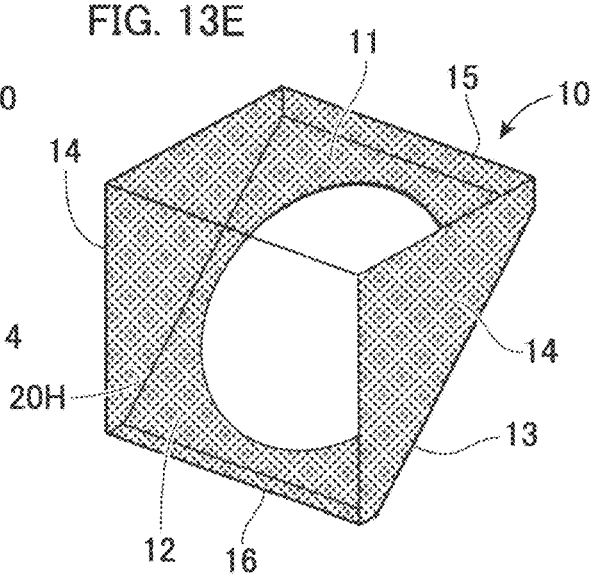

Since light (object-emanating light) enters the prism 10 through various stray light paths in addition to the first, second and third stray light paths shown in the drawings, as shown in FIG. 13E, it is also effective as a countermeasure against stray light to provide colored layers 20H, at portions other than (outside) the effective aperture, on at least one of the surfaces 11 to 16 of the prism 10 toward the inside thereof, whereby the colored layers 20H absorb a large amount of light (object-emanating light) traveling along the stray light paths. Accordingly, the portions where the colored layers 20H are provided may be a combination of the respective surfaces 11 to 16 of the prism 10 or only some of them.

For a camera unit (optical apparatus) installed in a mobile phone or a smartphone, etc., it is proposed to reduce the size in the camera-unit thickness direction by using a reflection member(s) that bends the optical path by approximately 90° at a predetermined position (start, end, middle) in the imaging lens system. Furthermore, it has been proposed to drive (physically move) the reflection member to cancel camera shake during a photographing operation, etc. In an optical system that uses a prism as a reflection member, a surface that would otherwise cause stray light may be formed as a rough surface so that stray light (internal reflection or scattered light) from a side surface, etc., of the prism does not reach the imaging surface; the prism size may be increased so that harmful light rays do not enter a subsequent lens group or imaging sensor; black ink may be applied, or a light shielding sheet may be inserted.

However, when a rough surface is provided as a countermeasure against stray light, although the specular reflection component of light is reduced, scattered light occurs, which becomes a source of flare that causes a haze to appear over the entire picture image (picture frame).

Increasing the size of the prism also increases the size of the camera unit. In addition, the weight of the prism increases, and the prism fixed with an adhesive, or the like, may fall out without being able to withstand an impact if the camera unit is dropped, etc. In addition, it is necessary to increase the driving power for driving (physically moving) the heavier prism, which results in excessive battery consumption.

If black ink is applied as a countermeasure against stray light, unless the black ink is applied with a sufficient thickness, light can still be transmitted and a sufficient light shielding effect cannot be obtained. Furthermore, if the surface that has been applied with black ink is fixed to the lens frame with an adhesive, when removing the adhesive from the lens frame in order to repair (reassemble) the camera unit, the black ink would also come off the portion of the prism that was adhered to the lens frame so that the prism cannot be reused or may need to be recoated with black ink again.

Furthermore, since it is difficult to adhere (apply) the black ink onto mirror-finished surfaces (optically polished surfaces) of an incident surface, an exit surface, and a reflection surface of the prism, it may be possible to insert a light shielding sheet in order to shield harmful rays. In such a case, since reflection occurs at the aperture edge surface of the light shielding sheet, it is effective to use a sheet material that is as thin as possible; however, there is a limit on how much the thickness can be reduced. On the other hand, if the entire light shielding sheet is made very thin, it becomes difficult to handle such a thin sheet material when it is assembled into the camera unit. For example, when the light shielding sheet is held by tweezers, or the like, the light shielding sheet twists, which makes it difficult to place the sheet at the desired (design) position, or a crease or fold mark may form when the light shielding sheet is clasped with tweezers, etc. Accordingly, the prism is fixed by sandwiching the light shielding sheet between the prism and another member within the camera unit, so that the prism easily tilts, leading to deterioration in the assembly precision.

In the illustrated examples, by providing the prism 10 with the colored layer(s) 20A through 20E, 20G or 20H, it is possible to take countermeasures against stray light which have high light absorption, little reflection or scattering, and superior light-shielding properties. In addition, there also is the advantage of being able to provide coloration regardless of the surface state of the glass body such as a mirror-finished surface, or a rough surface, etc. Furthermore, even when an adhesive, etc., having a refractive index different from that of air comes into contact with the colored layer, the absorption properties are not adversely affected. Furthermore, there is also no risk of the colored layer being peeled off or removed by an adhesive, etc. Furthermore, since the colored portion and the non-colored portion have the same refractive index, reflection due to a difference in refractive index does not occur at the boundary between the colored portion and the non-colored portion, so that the reflection of light on the edge surface of the colored layer becomes extremely small. Furthermore, since a layer such as a coating of black ink is not applied onto the glass surface, the positioning accuracy of the glass element (optical element) and another member (for example, another glass element (optical element)) is not adversely affected.

<Applying an Optical eElement to a Lens Element>

A case where the optical element of the present disclosure is applied to a lens element 30 will be described with reference to FIGS. 14 through 18.

Figure 14:
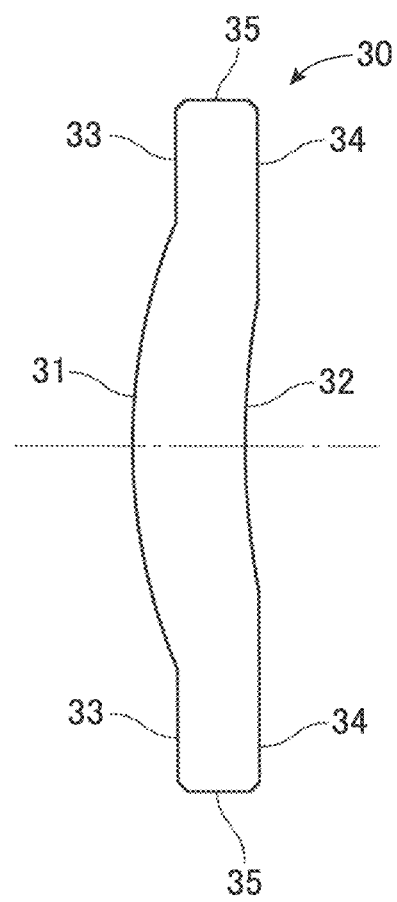
FIG. 14 is a cross-sectional view of a lens structure that constitutes an optical element.

FIG. 14 is a cross-sectional view showing an example of a structure of the lens element 30 as an optical element.

In FIG. 14, the left side of the lens element 30 is the object side (one surface side) and the right side is the image side (the other surface side). The lens element 30 is provided with an object-side lens surface 31 having a convex surface on the object side, and an image-side lens surface 32 having a concave surface on the image side. Each of the object-side lens surface 31 and the image-side lens surface 32 constitutes an optical surface including a region inside the effective aperture and a region outside the effective aperture. The lens element 30 has a flat object-side land surface (object-side flange portion) 33 at the radially outer portion of the object-side lens surface 31, and a flat image-side land surface (image-side flange portion) 34 at the radially outer portion of the image-side lens surface 32. The lens element 30 has a flat edge surface 35 (in a cross-sectional view) as an outer peripheral surface connecting the outer diameter ends of the object-side land surface 33 and the image-side land surface 34.

The shape of the lens element 30 illustrated in FIG. 14 is merely an example; various design changes are possible. For example, the lens element 30 may have a biconvex shape, a biconcave shape, a convex meniscus shape, a concave meniscus shape, a plano-convex shape, or a plano-concave shape. Furthermore, the lens element 30 may be of any type such as a cylindrical lens, an array lens, or a Fresnel lens, etc. Furthermore, as an alternative to a round shape (when viewed in the optical-axis direction), the lens element 30 may have a substantially square shape, a substantially rectangular shape, or a polygonal shape, etc.

Figure 15A:
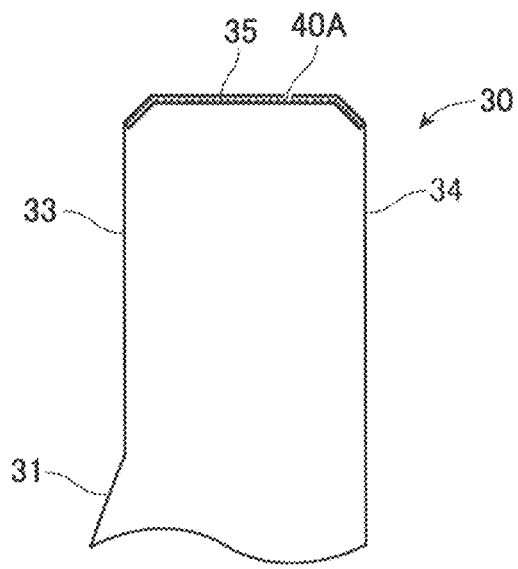
FIGS. 15A through 15C are cross-sectional partial views of examples of colored layers provided at portions outside the effective aperture of a lens element.
Figure 15B:
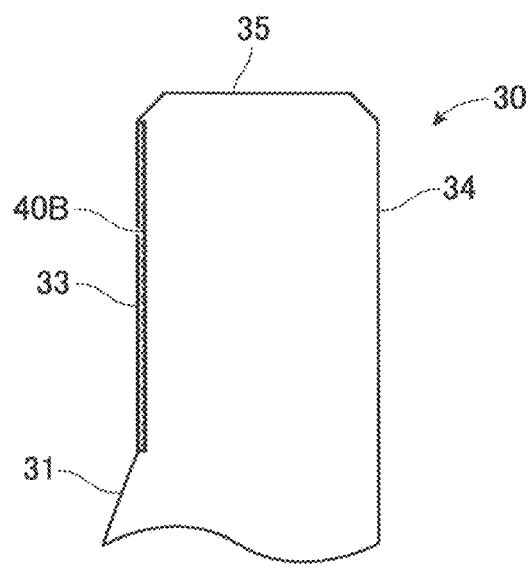
Figure 15C:
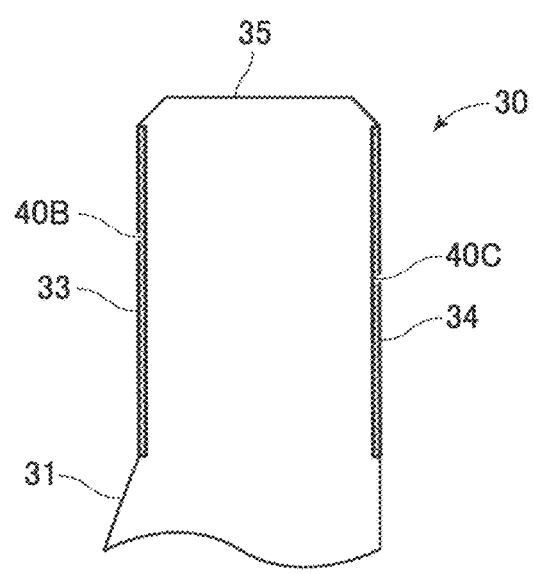

FIGS. 15A through 15C are cross-sectional partial views of examples of colored layers provided at portions outside the effective aperture of the lens element 30. As shown in FIGS. 15A through 15C, the colored layer may be provided (positioned) on (and within) at least one of the edge surface 35 and a land surface (the object-side land surface 33 and/or the image-side land surface 34) of the lens element 30.

In FIG. 15A, a colored layer 40A is provided (positioned) on the edge surface 35 of the lens element 30.

In FIG. 15B, a colored layer 40B is provided (positioned) on the object-side land surface 33 of the lens element 30.

In FIG. 15C, the colored layer 40B is provided (positioned) on the object side land surface 33 of the lens element 30 and a colored layer 40C is provided (positioned) on the image side land surface 34 of the lens element 30).

Figure 16:
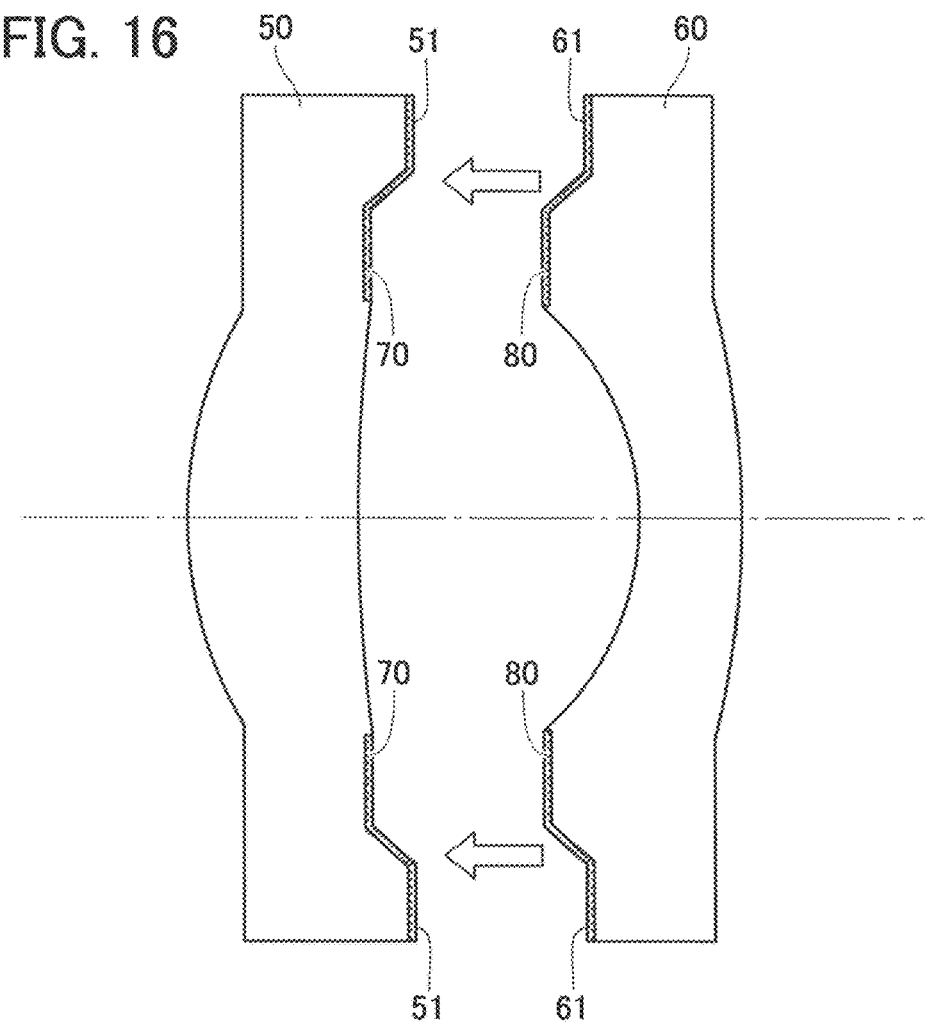
FIG. 16 is a cross-sectional view of an example where colored layers are provided at portions outside the effective aperture of two lens elements that are adjacent with respect to the optical axis direction.

FIG. 16 is a cross-sectional view of an example where colored layers are provided at portions outside the effective aperture of two lens elements (an object-side lens element 50 and an image-side lens element 60) that are adjacent with respect to the optical axis direction. In FIG. 16, the left side is the object side (one surface side) and the right side is the image side (the other surface side). The object-side lens element 50 is provided with an image-side land surface 51 positioned radially outside the image-side lens surface, and the image-side lens element 60 is provided with an object-side land surface 61 positioned radially outside the object-side lens surface. The positions of the two lens elements 50 and 60 are restricted in the optical axis direction by bringing the image-side land surface 51 and the object-side land surface 61 into contact with each other.

A colored layer 70 is provided (positioned) on the image-side land surface 51 of the lens element 50, and the colored layer 80 is provided (positioned) on the object-side land surface 61 of the lens 60. Namely, the colored layers 70 and 80 are provided (positioned) on the land surfaces (the image-side land surface 51 and the object-side land surface 61) of the two lens elements 50 and 60 that abut against each other.

In an assembly structure (method) in which land surfaces of adjacent lens elements (corresponding to the lens elements 50 and 60) are brought into contact with each other in order to improve distance and eccentricity precision between the adjacent lens elements, if black ink is coated on the land surfaces of the adjacent lens elements or if a light-shielding sheet is inserted in between the land surfaces of the adjacent lens elements, the assembling precision of the adjacent lens elements would be reduced. Therefore, the land surfaces of the adjacent lens elements cannot be shielded from light, and light rays passing therethrough may cause stray light to occur.

Whereas, in the present disclosure, as shown in FIG. 16, foreign matter does not exist between the image-side land surface 51 and the object-side land surface 61 of the two lens elements 50 and 60, and since the colored layers 70 and 80 exist as a part of the two lens elements 50 and 60, respectively, the abutment precision (assembling precision) of the two lens elements 50 and 60 (the image-side land surface 51 and the object-side land surface 61) is maintained at a high level while achieving favorable countermeasures against stray-light.

Figure 17:
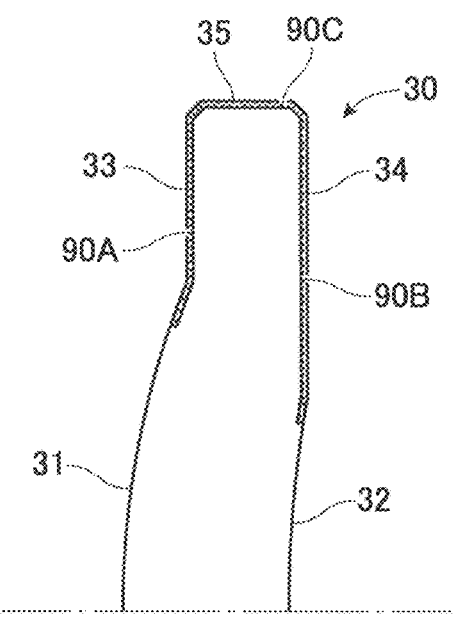
FIG. 17 is a cross-sectional view of an example where a colored layer functions as a diaphragm.

FIG. 17 shows an example in which the colored layer functions as a diaphragm. As shown in FIG. 17, a colored layer 90A is provided (positioned) on the object-side land surface 33 and extends over part of the object-side lens surface 31 of the lens element 30, a colored layer 90B is provided (positioned) on image-side land surface 34 and extends over part of the image-side lens surface 32 of the lens element 30, and a colored layer 90C is provided (positioned) on the edge surface 35 of the lens element 30.

The colored layers 90A and 90B are formed on the respective land surfaces (the object-side land surface 33 and the image-side land surface 34) and extend over to the object-side lens surface 31 and the image-side lens surface 32 (one surface and the other surface) from the positions of the effective aperture of the lens element 30 to define the effective aperture of the lens element 30 (the colored layers 90A and 90B function as diaphragms). Accordingly, since the effective aperture of the object-emanating light bundle can be defined without inserting a physical diaphragm, the structure can be simplified and the number of parts can be reduced to simplify the assembly process. The function of the diaphragm may be, for example, an aperture diaphragm that determines the light-ray height of an axial light bundle, or a fixed diaphragm that determines the light-ray height of an abaxial light bundle.

Figure 18A:
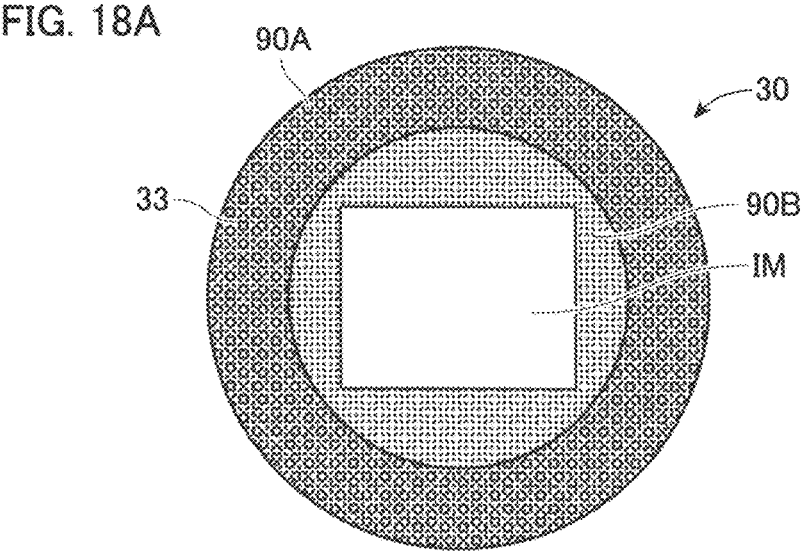
FIGS. 18A through 18C show an example where colored regions of colored layers mutually differ on either side of a lens element.
Figure 18B:
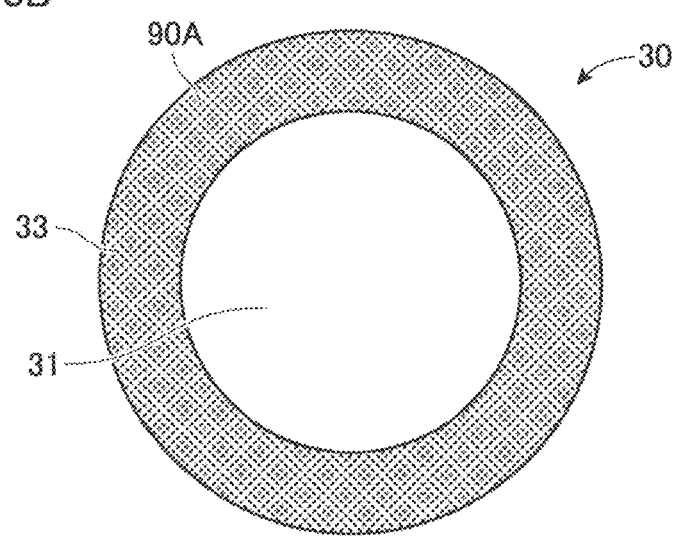
Figure 18C:
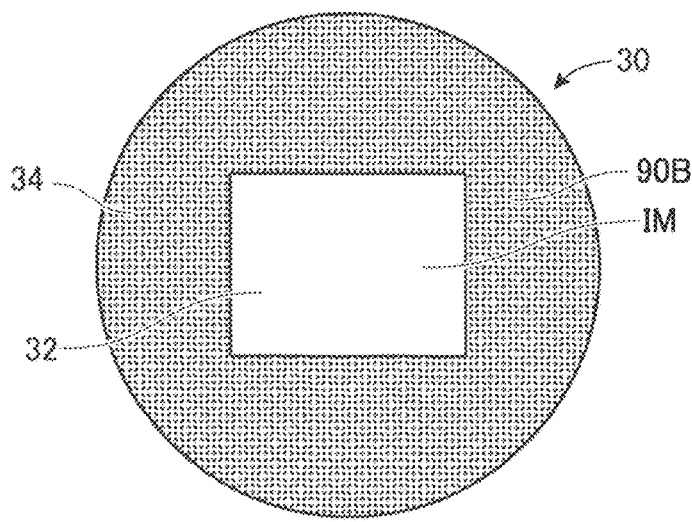

FIGS. 18A through 18C show an example where colored regions of colored layers mutually differ on either side of the lens element 30. In FIGS. 18A through 18C, the rectangular region depicted in the center corresponds to an image pickup region IM by an imaging sensor. In FIG. 18A, the pattern portion radially outside the annular line surrounding the imaging region IM corresponds to the colored layer (colored region) 90A on the object-side surface (one surface) of the lens element 30. In FIG. 18A, the pattern portions radially inside and outside the annular line surrounding the imaging region IM correspond to the colored layer (colored region) 90B on the image-side surface (the other surface) of the lens element 30. FIG. 18B shows a colored region (90A) on the object-side surface (one surface) of the lens element 30, and FIG. 18C shows a colored region (90B) on the image-side surface (the other surface) of the lens element 30. If the lens element 30 converges light (object-emanating light) with a positive refractive power, as shown in FIGS. 18A through 18C, the colored region (90A) on the object-side surface (one surface) of the lens element 30 is formed relatively small in area, and the colored region (90B) on the image-side surface (the other surface) of the lens element 30 is formed relatively large in area.

Conversely, if the lens element 30 diverges light (object-emanating light) with a negative refractive power, the colored region on the object-side surface (one surface) of the lens element 30 maybe formed relatively large in area, and the colored region (90B) on the image-side surface (the other surface) of the lens element 30 may be formed relatively small in area.

Accordingly, the colored layers can be provided (positioned) at mutually different colored regions outside the effective aperture of the object-side surface and the image-side surface (one and the other surfaces) of the lens element 30 in accordance with (corresponding to) the angle of the light rays to be shielded. With such a structure, for example, light can be shielded by the coloration even at the position where the lens element 30 is recessed in the concave surface (which is an advantageous effect peculiar to the present invention, because it is otherwise difficult to insert a light shielding sheet beyond the inflection point). It should be noted that the shape of the colored region is not limited to a circular shape, and may have a degree of freedom in accordance with (corresponding to) the shape of the effective light-ray region.

In optical systems used in digital cameras, surveillance cameras, in-vehicle cameras, and action cameras, countermeasures against stray light occurring in the lenses thereof also need to be taken. For example, light shielding/reflection prevention outside the effective aperture of an optical component (lens element) is carried out by applying a coating of black ink or inserting a light shielding sheet as a countermeasure.

If black ink is applied, it is difficult to determine the actual diameter of the lens element because it is necessary to finish the lens diameter with consideration of the coating thickness. Furthermore, since the black ink coating thickness varies, the outer diameter dimension accuracy tends to deteriorate. If the black ink is not thick enough, harmful light-rays may pass through the black ink and reach the imaging sensor. On the other hand, if the black ink is applied too thickly, the edges of the black ink may shine and cause ghosting. Furthermore, for a lens element in which the lens surface and the land surface are formed by precision press molding, when black ink is applied onto the land surface, it is usually difficult to adhere the black ink onto the mirror-finished surface, so that in order to adhere the black ink onto the mirror-finished surface, an additional process such as centering for forming a rough surface is needed. For this reason, even if a lens element having a high precision sagittal dimensions (lens center height with respect to the land surface in the case of a convex surface, lens center depth with respect to the land surface in the case of a concave surface) is obtained by precision press molding, the accuracy of the sagittal dimensions tends to deteriorate due to the process for forming the rough surface on the land portion.

For example, in the case of inserting a substantially rectangular light-shielding sheet, if the assembly eccentricity accuracy of the sheet is poor, light-shielding will be insufficient in a certain specific direction. Furthermore, it is difficult to make the light shielding sheet enter into the concave portion defined by the concave surface of the lens element 30.

In the present disclosure, by providing any of the colored layers 40A through 40C, 70, 80, 90A through 90C on the corresponding lens elements 30, 50 and 60, it is possible to take countermeasures against stray light, which includes providing a high light absorbance, very little reflection and scattering, and superior light-shielding characteristics. In addition, the illustrated examples exhibit the advantage of coloration being possible regardless of the surface state of the glass body, whether such a surface is a mirror-finished surface or a rough surface. Furthermore, since the colored layer can be provided in a lens shape having a degree of freedom that matches the effective light-ray region without depending on the lens shape, it is possible to take countermeasures against stray light that have superior light shielding characteristics. Furthermore, since the colored portion and the non-colored portion have the same refractive index, reflection due to the difference in refractive index does not occur at the boundary between the colored portion and the non-colored portion, so that the reflection of light at the edge surface of the colored layer is extremely small/negligible. In addition, since no layer such as black ink is provided on the glass surface, the positioning accuracy of the glass element (optical element) and other members (for example, another glass element (optical element)) is not adversely affected.

<Applying the Optical Element to a Lens Array or Lenticular Lens>

Figure 19A:
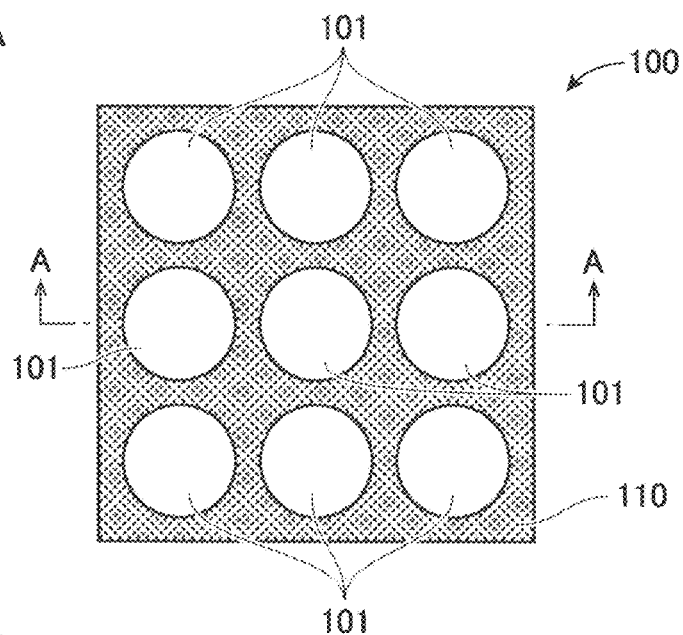
FIGS. 19A through 19C show examples where colored layers are provided on optical elements such as a lens array or a lenticular lens.

A case where the optical element of the present disclosure is applied to a microlens array 100 and a lenticular lens 120 will be described with reference to FIGS. 19A through 19C. FIG. 19A is a plan view showing the microlens array 100, FIG. 19B is a plan view showing the lenticular lens 120, and FIG. 19C is a cross-sectional view taken along the line A-A of FIG. 19A and the line B-B of FIG. 19B (both reference designators corresponding to FIGS. 19A and 19B are shown).

As shown in FIG. 19A, the microlens array 100 is a 2-dimensional array of a plurality (a large number) of microlenses (lens surfaces) 101, and there is a total of nine (3×3) microlenses 101 shown in the example in FIG. 19A. In addition, as shown in FIGS. 19A and 19C, a colored layer 110 is located outside the effective apertures of the plurality of microlenses 101 so that the colored layer 110 partitions the plurality of microlenses 101.

Figure 19B:
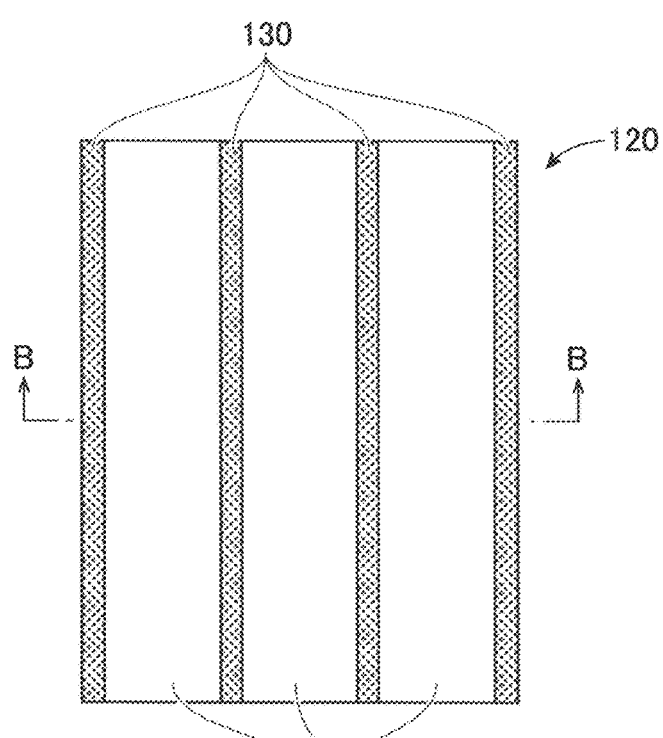
Figure 19C:
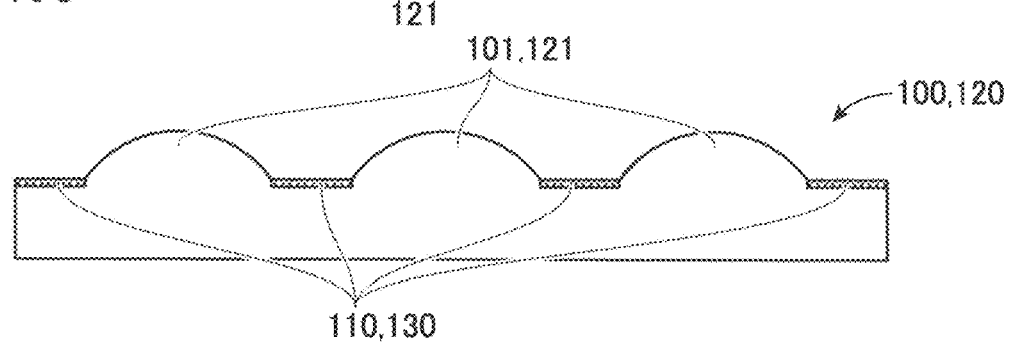

As shown in FIG. 19B, the lenticular lens 120 is formed by an arrangement of three lens surfaces 121 having a semi-cylindrical shape extending in the vertical direction (the number of lens surfaces is not limited to three; various design changes are possible). In addition, as shown in FIGS. 19B and 19C, a colored layer 130 is located outside the effective apertures of the plurality (three in this example) of lens surfaces 121 so that the colored layer 130 partitions the plurality of (three in this example) lens surfaces 121.

Accordingly, the optical element (the microlens array 100 or the lenticular lens 120) has a plurality of lens surfaces (101 or 121), and the colored layer (110 or 130) is provided outside the effective apertures of the plurality of lens surfaces (101 or 121) and partitions the plurality of lens surfaces (101 or 121). Such a structure makes it possible to effectively prevent, for example, light that could not be incident on the plurality of lens surfaces (101 or 121) from passing outside the effective aperture and becoming stray light.

<Applying the Optical Element to a Prism or Lens Element Coated with an Anti-Reflection Coating>

A case where the optical element of the present disclosure is applied to the prism 10 having an anti-reflection coating will be described hereinbelow with reference to FIG. 20A.

Figure 20A:
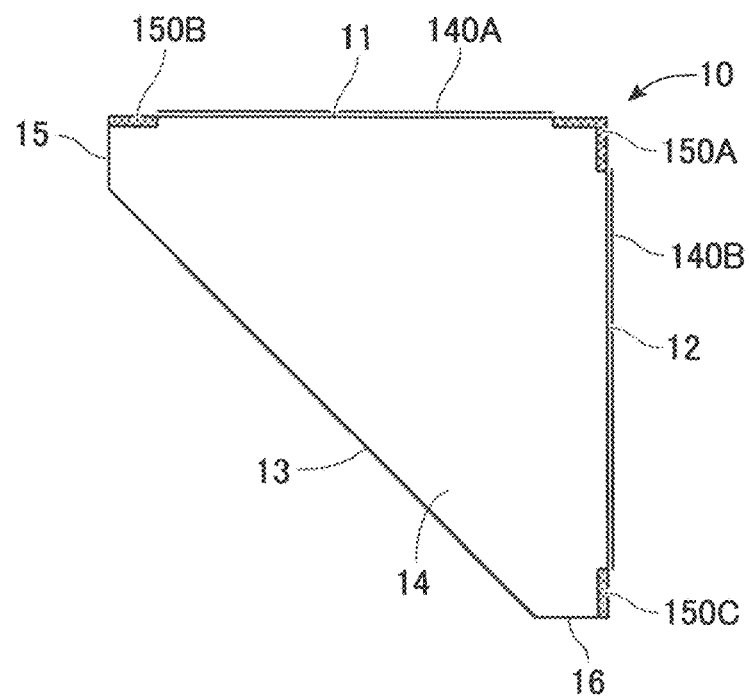
FIG. 20A and 20B show examples where colored layers are provided on surfaces of optical elements where anti-reflection coated surfaces are not provided.

As shown in FIG. 20A, an anti-reflection coating 140A is applied to the center of the incident surface 11 of the prism 10, and an anti-reflection coating 140B is applied to the center of the exit surface 12 of the prism 10. On the other hand, a substantially L-shaped portion located at the connecting portion (boundary portion) between the incident surface 11 and the exit surface 12 of the prism 10 is not provided with an anti-reflection coating. The portion located at the connection portion (boundary portion) between the incident surface 11 of the prism 10 and the chamfered surface 15 is not coated with the anti-reflection coating. Furthermore, the anti-reflection coating is not applied to the portion of the exit surface 12 of the prism 10 located at the connection portion (boundary portion) with the chamfered surface 16.

Colored layers 150A, 150B, and 150C are provided on the incident surface 11 and the exit surface 12 of the prism from the surface of the glass element, where the anti-reflection coating is not applied, and toward the inside of the glass element. More specifically, the colored layer 150A is provided on the incident surface 11 and the exit surface 12 of the prism 10 at a substantially L-shaped portion (when viewed in cross section) located at a connecting portion (boundary portion) between the incident surface 11 and the exit surface 12. The colored layer 150B is provided on a portion of the incident surface 11 of the prism 10 that is located at a connection portion (boundary portion) with the chamfered surface 15. The colored layer 150C is provided on a portion of the exit surface 12 of the prism 10 that is located at a connection portion (boundary portion) with the chamfered surface 16.

A case where the optical element of the present disclosure is applied to a lens element 160 having an anti-reflection coating will be described with reference to FIG. 20B.

Figure 20B:
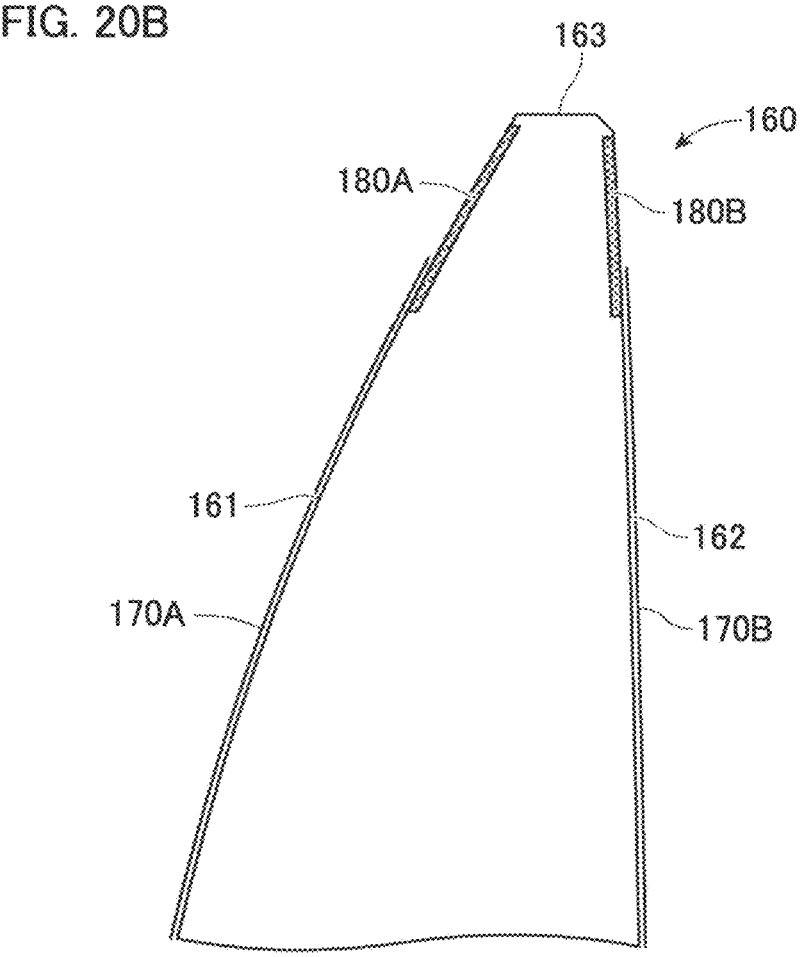

As shown in FIG. 20B, the lens element 160 has an object-side lens surface 161, an image-side lens surface 162, and an edge surface 163 that connects the outer peripheral ends of the object-side lens surface 161 and the image-side lens surface 162. The object-side lens surface 161 has a convex surface facing the object side, the image-side lens surface 162 has a convex surface facing the image side, and the lens element 160 has a biconvex profile as a whole.

An anti-reflection coating 170A is applied to almost the entire region of the object-side lens surface 161 of the lens element 160, and an anti-reflection coating 170B is applied to almost the entire region of the image-side lens surface 162 of the lens element 160. Whereas, the portions, of the object-side lens surface 161 and the image-side lens surface 162 of the lens element 160, located at the connection portions (boundary portions) with the edge surface 163 are not coated with anti-reflection coating. Furthermore, the edge surface 163 of the lens element 160 is also not coated with antireflection coating.

Furthermore, colored layers 180A and 180B are provided, respectively, on the object-side lens surface 161 and the image-side lens surface 162 of the lens 160, from the glass surface of the portion where an anti-reflection coating is not applied toward the inside of the glass element. More specifically, the colored layer 180A is provided on a portion of the object-side lens surface 161 of the lens 160, which is located at a connection portion (boundary portion) with the edge surface 163. The coloring layer 180B is provided on a portion of the image-side lens surface 162 of the lens 160 which is located at a connection portion (boundary portion) with the edge surface 163.

As shown in FIGS. 20A and 20B, the prism 10 and the lens element 160 are provided as optical elements with anti-reflection coated surfaces (surfaces having anti-reflection coatings 140A, 140B, 170A, 170B) and uncoated surfaces where anti-reflection coatings are not provided. The coloring layers 150A through 150C, 180A and 180B are provided (positioned) on the uncoated surfaces where anti-reflection coatings are not provided.

In optical members such as lens elements and prisms, it is standard practice to apply an anti-reflection coating onto the optical surface thereof. When applying an anti-reflection coating onto an optical member, a part of the optical member is sometimes pressed against and held by a jig so that the optical member does not move within the jig. In such a case, since the anti-reflection coating is not formed on the portion of the optical member that is held by the jig so that the glass surface is exposed thereat, a portion having a high reflectance is formed. In addition, the coating properties at the boundary between the anti-reflection coating surface and the uncoated surface that is not provided with an anti-reflection coating are such that, due to the shielding/masking effect caused by the coating jig, the anti-reflection coating is not formed by a film thickness as designed, and there is a risk of there being an unintended high reflectivity.

Therefore, in order to shield the light incident on the anti-reflection coating surface (including the boundary with the anti-reflection coating surface), it is conceivable to cover the anti-reflection coating surface from the outside of the optical member with a lens frame or a light shielding sheet. However, in such a case, although it is possible to shield the light that enters the anti-reflection coating from the outside of the optical member, since it is not possible to shield the light that enters the anti-reflection coating from inside of the optical member, stray light may occur due to the uncoated surface that is not provided with an anti-reflection coating.

In the manufacturing processes of optical members (lens elements and prisms), one conceivable option would be to apply an anti-reflection coating onto the entire surface of the lens before the centering process is carried out so that such an uncoated surface (where an anti-reflection coated surface is not provided) does not occur, and thereafter, the centering process would performed so that the entire optical surface would have an anti-reflection function. However, one flaw with this approach (process) is that since the bell clamp of the centering machine is brought into contact with the surface provided with the anti-reflection coating when the centering process is performed, the anti-reflection coat is susceptible to scratches or marks.

On the other hand, in the optical member (lens element or prism) of the present disclosure, by providing a colored layer(s) on an uncoated surface(s) where an anti-reflection coated surface is not provided, the light from inside the optical member that enters into the uncoated surface (where an anti-reflection coated surface is not provided) can be absorbed, and thereby be attenuated/shielded. Furthermore, since a colored layer can be provided regardless of the surface state of the glass element, such as a mirror-finished surface or a rough surface, it is possible to effectively achieve light attenuation or light shielding by providing the colored layer. In addition, since a film formation process of anti-reflection coating can be performed after forming the colored layer and performing a centering process, or at a timing after performing the centering process thereafter forming the colored layer, the occurrence of, e.g., scratches or marks on the anti-reflection coating due to a bell clamp is also reliably avoided.

<Applying the Optical Element to an Optical Window>

A case where the optical element of the present disclosure is applied to an optical window including an exit window and an incident window will be described with reference to FIGS. 21A, 21B and FIGS. 22A, 22B. A sensor device (sensor unit/optical apparatus) that acquires information of a detection target by reflecting light, emitted from a light emitting unit (light emitter), off the detection target and receiving the reflected light on a light receiving unit (light receiver) will be described hereinbelow as an example.

Figure 21A:
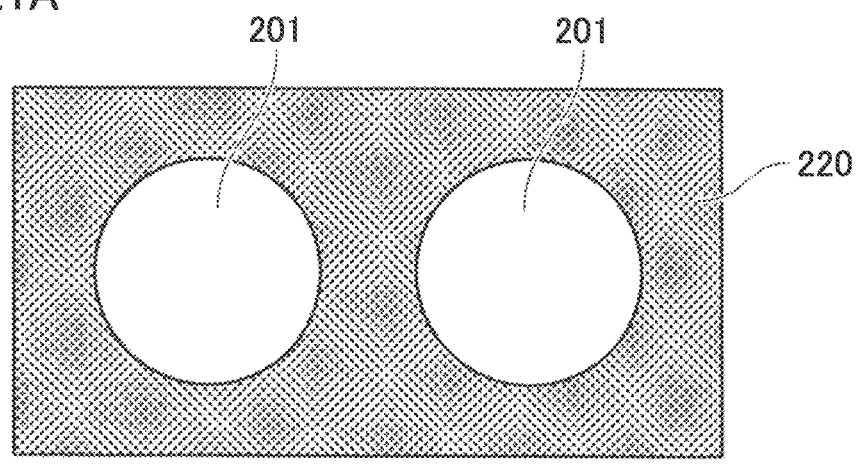
FIGS. 21A and 21B show a first example where an optical element is applied to an optical window.
Figure 21B:
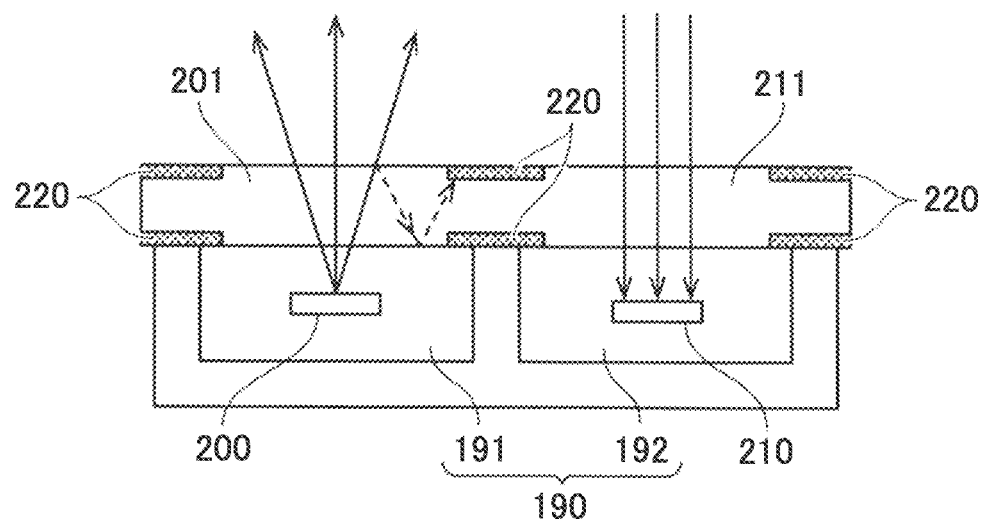
Figure 22A:
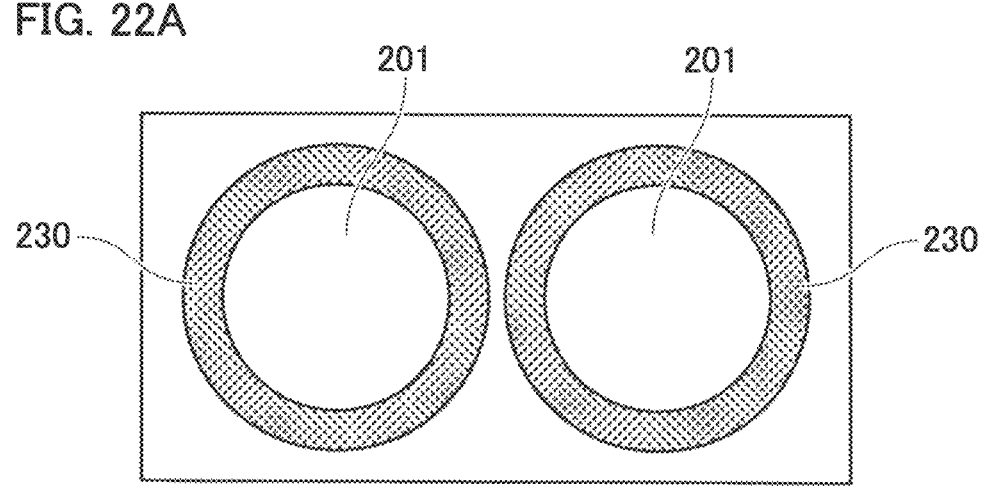
FIG. 22A and 22B show a second example where an optical element is applied to an optical window.
Figure 22B:
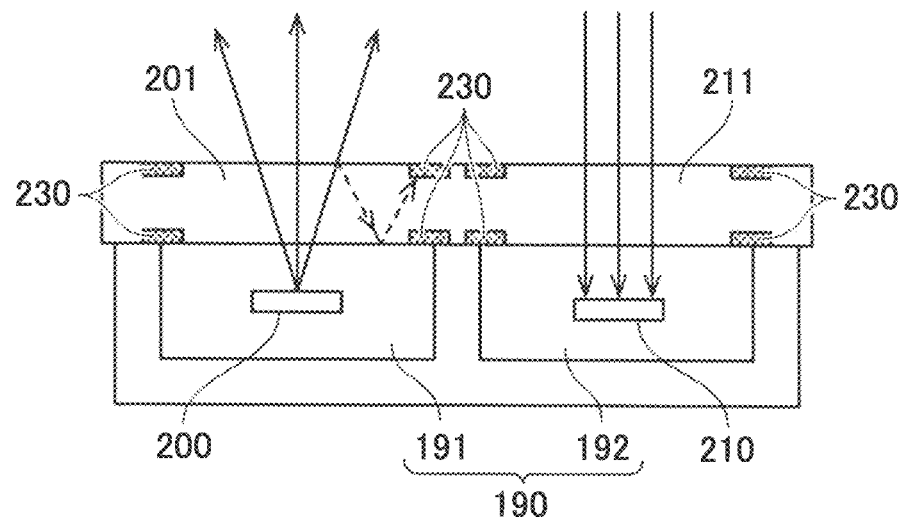

As shown in FIGS. 21B and 22B, the sensor device is provided with a housing 190 that accommodates optical members (optical elements). The housing 190 is provided with a light emitting-side storage chamber 191 that accommodates a light emitting optical member (optical element), and a light receiving-side storage chamber 192 that accommodates a light receiving optical member (optical element).

A light-emitting unit (light emitter) 200 is accommodated in the light emitting-side storage chamber 191, and an exit window 201 is provided on the upper surface thereof. The exit window 201 emits light from the light-emitting unit 200 toward the detection target (i.e., the light from the light emitting unit 200 is emitted). Although the light emitting unit 200 has been described as an optical member (optical element) accommodated inside the light emitting-side storage chamber 191, various other optical components (optical elements) such as a projection lens, a filter(s), a diffusion plate, and a diffractive element may also be included.

A light-receiving unit (light receiver) 210 is accommodated in the light receiving-side storage chamber 192, and an incident window 211 is provided on the upper surface thereof. The incident window 211 allows the light emitted from the light emitting unit 200 and reflected by the detection target to enter the light-receiving unit 210 (i.e., light enters the light receiving unit 210). Although the light-receiving unit 210 has been described as an optical member (optical element) accommodated in the light receiving-side storage chamber 192, various other optical components (optical elements) such as a light-receiving lens and a filter(s) may also be included.

In FIGS. 21A and 21B, (two upper and lower) colored layers 220 are provided at locations outside the effective apertures of the exit window 201 and the incident window 211, and partition the exit window 201 and the entrance window 211. The colored layers 220 are provided over the entire area (substantially the entire area) outside the effective apertures of the exit window 201 and of the incident window 211.

In FIGS. 22A and 22B, coloring layers 230 are provided at locations outside the effective apertures of the exit window 201 and the incident window 211, and partition (define) the exit window 201 and the entrance window 211. The colored layers 230 including an annular colored layer located around and outside the effective aperture of the exit window 201, and an annular colored layer located around and outside the effective aperture of the incident window 211.

For example, in the sensor device (sensor unit) described in the present disclosure, the light emitting unit 200 and the light receiving unit 210 are adjacent to each other, and the light from the light emitting unit 200 is reflected by the detection target object to be received by the light receiving unit 210 to thereby obtain information of the detection target object. However, part of the light from the light emitting unit 200 is reflected/scattered through the window materials of the exit window 201 and the incident window 211, and this reflected/scattered light propagates inside the housing 190. In other words, there is a risk of part of the light emitted from the light emitting unit 200 not being emitted toward the object to be detected, but rather is repeatedly reflected inside the housing 190 a plurality of times, and thereafter is incident on the light receiving unit 210, thereby resulting noise and/or false detection occurring in the sensing operation of the sensor device.

The above adverse effects can be reduced by providing a sufficient distance between the light emitting unit and the light receiving unit and/or using separate window members for the light emitting unit and the light receiving unit. However, there are numerous unavoidable disadvantages with such countermeasures, such as it being necessary to provide frame parts for fixing the window members therebetween, the size of the sensor unit becoming large, an increase in the number of parts, and an increase in cost.

Whereas, in the optical element (optical window, exit window, incident window) of the present disclosure, since a colored layer (absorption layer having high light absorbance) is formed inside the glass material of the optical window (exit window, incident window), stray light is attenuated when entering the colored layer, and reflection/scattering inside the window frame can be prevented. In addition, the size of the product (sensor unit) can be kept small by reducing the distance between the light emitting unit and the light receiving unit, and special structural solutions (countermeasures) other than providing a colored layer on the optical window (exit window, incident window) can be eliminated, thereby reducing the number of parts/components and reducing costs. Furthermore, by providing the colored layer regardless of the surface state of the glass element, such as a mirror-finished surface or a rough surface, it is possible to effectively achieve attenuation of light and light shielding. Furthermore, since the shape of coloring the optical window (exit window, incident window) can be provided with flexibility, it is possible to improve designability.

<Applying the Optical Element for Other Uses>

In addition to the examples described above, the optical element of the present disclosure may be used as at least one of a flat parallel plate, a cover glass (cover glass for an imaging sensor), an optical filter (IR cut filter, polarization filter, ND filter, etc.), and a beam splitter. In such a case, the colored layer can be positioned outside the effective aperture of the at least one of the flat parallel plate, the cover glass (cover glass of an imaging sensor), the optical filter (IR cut filter, polarization filter, ND filter, etc.), and the beam splitter.

INDUSTRIAL APPLICABILITY

The optical element and the optical apparatus of the present disclosure can be applied to, for example, in-built cameras mounted in various mobile phones, smartphones, digital cameras, surveillance cameras, on-board vehicle cameras, action cameras, and the like.

Obvious changes may be made in the specific examples/embodiments of the present invention described herein, such modifications being within the spirit and scope of the invention claimed. It is indicated that all matter contained herein is illustrative and does not limit the scope of the present invention.

What is claimed is:

1. An optical element including a glass body, the optical element comprising:
   a colored layer provided inside the glass body and positioned outside an effective aperture of the optical element,
   wherein coloring of the colored layer is a reduction pigment occurring in a glass component of the glass body.

2. The optical element according to claim 1, wherein the colored layer is positioned from a surface of the glass body and extends inside the glass body.

3. The optical element according to claim 2, wherein a thickness of the colored layer from the surface of the glass body and extending inside the glass body is 1 through 300 µm.

4. The optical element according to claim 1, wherein an optical density OD of the colored layer is 2.0 or more at a wavelength of 750 nm.

5. The optical element according to claim 1, wherein the optical element is provided with an anti-reflection coated surface and a surface without an anti-reflection coating, and
   wherein the colored layer is provided at the surface without the anti-reflection coating.

6. The optical element according to claim 1, wherein the optical element comprises a prism, including an incident surface, an exit surface, a reflection surface, and a side surface, and
   wherein the colored layer is provided on the prism on at least one of the incident surface, the exit surface, the reflection surface, the side surface, and or a chamfered surface at a boundary portion defined at any one of the incident surface, the exit surface, the reflection surface, and the side surface.

7. The optical element according to claim 1, wherein the optical element comprises a lens element, and
   wherein the colored layer is provided on at least one of an edge surface and or a land surface of the lens element.

8. The optical element according to claim 1, wherein the optical element comprises two adjacent lens elements,
   wherein each of the two adjacent lens elements includes a land surface positioned radially outside the effective aperture of the lens element thereof, and the respective land surfaces of the two adjacent lens elements are brought into contact with each other, and
   wherein colored layers are respectively provided on the land surfaces.

9. The optical element according to claim 1, wherein the optical element comprises a lens element, and
   wherein the colored layer defines the effective aperture on at least one surface of the lens element.

10. The optical element according to claim 1, wherein the optical element comprises a lens element, and
    wherein the colored layer is provided at mutually different colored regions, outside the effective aperture, on first and second surfaces of the lens element.

11. The optical element according to claim 1, wherein the optical element comprises a plurality of lens surfaces, and wherein the colored layer is provided outside effective apertures of the plurality of lens surfaces, respectively, to thereby partition the plurality of lens surfaces.

12. The optical element according to claim 1, wherein the optical element comprises an exit window, from which light that is emitted from a light emitter exits, and an incident window, to which light travelling toward a light receiver is incident, and wherein the colored layer is provided outside an effective aperture of the exit window and outside an effective aperture of the incident window so that the colored layer partitions the exit window and the incident window.

13. The optical element according to claim 1, wherein the optical element comprises at least one of a flat parallel plate, a cover glass, an optical filter, or a beam splitter, and wherein the colored layer is provided outside an effective aperture of the at least one of the flat parallel plate, the cover glass, the optical filter, or the beam splitter.

14. An optical apparatus comprising the optical element of claim 1.

15. The optical element according to claim 1, wherein a refractive index of the colored layer is same as a refractive index of the glass body.

16. The optical element according to claim 1, wherein the glass component comprises at least one ion selected from the group consisting of Ti-ion, Nb-ion, W-ion, and Bi-ion.

17. The optical element according to claim 1, wherein spectral transmittance of the colored layer from a visible light region to an infra-red region shows a tendency to increase as the wavelength increases.

18. The optical element according to claim 1, wherein a refractive index of the glass body is 1.70 or more.

* * * * *